US012659819B2

(12) United States Patent
Spapis et al.

(10) Patent No.: US 12,659,819 B2
(45) Date of Patent: Jun. 16, 2026

(54) RANDOM ACCESS CONFUSION AVOIDANCE

(71) Applicant: Nokia Technologies Oy, Espoo (FI)

(72) Inventors: Panagiotis Spapis, Munich (DE); Umur Karabulut, Munich (DE); Ahmad Awada, Munich (DE); Sanjay Goyal, Denville, NJ (US); Ali Karimidehkordi, Munich (DE); Halit Murat Gürsu, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 526 days.

(21) Appl. No.: 18/296,929

(22) Filed: Apr. 6, 2023

(65) Prior Publication Data

US 2024/0340718 A1     Oct. 10, 2024

(51) Int. Cl.
*H04W 36/00*        (2009.01)
*H04W 36/24*        (2009.01)
(Continued)

(52) U.S. Cl.
CPC ..... *H04W 36/0072* (2013.01); *H04W 36/249* (2023.05); *H04W 36/324* (2023.05); *H04W 74/002* (2013.01); *H04W 74/0833* (2013.01)

(58) Field of Classification Search
CPC ........... H04W 36/0072; H04W 36/249; H04W 36/324; H04W 74/002; H04W 74/0833; H04W 56/0045; H04W 74/0838
See application file for complete search history.

(56) References Cited

U.S. PATENT DOCUMENTS

2022/0110039 A1*  4/2022  Soldati ............... H04W 28/082
2023/0112574 A1   4/2023  Tseng et al.
2023/0388871 A1*  11/2023  Guo ................. H04W 36/0069

FOREIGN PATENT DOCUMENTS

CN          115884291 A       3/2023

OTHER PUBLICATIONS

Yulong Shi et al: "RACH-less cell switch in LTM", 3GPP Draft; R2-2301150; Type Discussion; NR_MOB_ENH2-Core, 3rd Generation Partnership Project (3GPP), Mobile Competence Centre ; 650, Route Des Lucioles ; F-06921 Sophia-Antipolis Cedex; France vol. 3GPP RAN 2, No. Athens, GR; Feb. 27, 2023-Mar. 3, 2023 Feb. 17, 2023 (Feb. 17, 2023), XP052245789, Retrieved from the Internet: URL:https://www.3gpp.org/ftp/TSG_RAN/WG2_RL2/TSGR2_121/Docs/R2-2301150.zip R2-2301150 RACH-less cell.
(Continued)

*Primary Examiner* — Nizam U Ahmed
(74) *Attorney, Agent, or Firm* — Carter, DeLuca & Farrell LLP

(57)            ABSTRACT

A user equipment apparatus (UE) includes processor(s) and memory storing instructions. The instructions, when executed by the processor(s), cause the UE to: prepare for timing advance (TA) acquisition for a candidate target cell; prepare for handover to the candidate target cell; identify at least one contention-free random access (CFRA) resource for the TA acquisition and for the handover; in case the CFRA resource(s) include a same CFRA resource for the TA acquisition and for the handover, use the same CFRA resource for the TA acquisition and for the handover; and in case the CFRA resource(s) include a first CFRA resource for the TA acquisition and a second CFRA resource for the handover, use the first CFRA resource for the TA acquisition for the candidate target cell and use the second CFRA resource for the handover to the candidate target cell.

26 Claims, 24 Drawing Sheets

(51) Int. Cl.
    *H04W 36/32*       (2009.01)
    *H04W 74/00*       (2009.01)
    *H04W 74/0833*     (2024.01)

(56)                References Cited

OTHER PUBLICATIONS

CATT: "On time advance management to reduce latency", 3GPP Draft; RI-2208959, 3rd Generation Partnership Project (3GPP), Mobile Competence Centre; 650, Route Des Lucioles; F-06921 Sophia-Antipolis Cedex; France vol. RAN WG1, No. e-Meeting; Oct. 10, 2022-Oct. 19, 2022 Sep. 30, 2022 (Sep. 30, 2022), XP052276879, Retrieved from the Internet: URL:https://ftp.3gpp.org/tsg_ran/WG1_RL1/TSGR1_110b-e/Docs/R1-2208959.zip RI-2208959.docx [retrieved on Sep. 30, 2022] section 2.

Apple Inc: "Timing advance management to reduce mobility latency", 3GPP Draft; RI-2209604, 3rd Generation Partnership Project (3GPP), Mobile Competence Centre; 650, Route Des Lucioles; F-06921 Sophia-Antipolis Cedex; France vol. RAN WG1, No. e-Meeting; Oct. 10, 2022-Oct. 19, 2022 Sep. 30, 2022 (Sep. 30, 2022), XP052259077, Retrieved from the Internet: URL:https://ftp.3gpp.org/tsg_ran/WG1_RL1/TSGR1_110b-e/Docs/R1-2209604.zip RI-2209604.docx [retrieved on Sep. 30, 2022] section 2.2; figure 2.

Bo Gao et al: "Enhancements on TA management to reduce latency", 3GPP Draft; RI-2300189; Type Discussion; NR_MOB_ENH2-Core, 3rd Generation Partnership Project (3GPP), Mobile Competence Centre; 650, Route Des Lucioles; F-06921 Sophia-Antipolis Cedex; France vol. 3GPP RAN 1, No. Athens, GR; Feb. 27, 2023-Mar. 3, 2023 Feb. 17, 2023 (Feb. 17, 2023), XP052247338, Retrieved from the Internet: URL:https://www.3gpp.org/ftp/TSG_RAN/WG1_RL1/TSGR1_112/Docs/R1-2300189.zip RI-2300189.

Yan Cheng et al: "Timing advance management to reduce latency", 3GPP Draft; RI-2210898; Type Discussion; NR_MOB_ENH2-Core, 3rd Generation Partnership Project (3GPP), Mobile Competence Centre; 650, Route Des Lucioles; F-06921 Sophia-Antipolis Cedex; France vol. 3GPP RAN 1, No. Toulouse, FR; Nov. 14, 2022-Nov. 18, 2022 Nov. 7, 2022 (Nov. 7, 2022), XP052221461, Retrieved from the Internet: URL:https://www.3gpp.org/ftp/TSG_RAN/WG1_RL1/TSGR1_111/Docs/R1-2210898.zip.

Sanjay Goyal et al: "Timing Advance Management for L1/L2-triggered Mobility", 3GPP Draft; RI-2300385; Type Discussion; NR_MOB_ENH2-Core, 3rd Generation Partnership Project (3GPP), Mobile Competence Centre; 650, Route Des Lucioles; F-06921 Sophia-Antipolis Cedex; France vol. 3GPP Ran 1, No. Athens, GR; Feb. 27, 2023-Mar. 3, 2023 Feb. 17, 2023 (Feb. 17, 2023), XP052247528, Retrieved from the Internet: URL:https://www.3gpp.org/ftp/TSG_RAN/WG1_RL1/TSGR1_112/Docs/R1-2300385.zip R1-2300385_On.

International Search Report issued by the European Patent Office acting as the International Searching Authority in relation to International Application No. PCT/EP2024/055582 dated Jul. 3, 2024 (6 pages).

Written Opinion of the International Searching Authority issued by the European Patent Office acting as the International Searching Authority in relation to International Application No. PCT/EP2024/055582 dated Jul. 3, 2024 (11 pages).

* cited by examiner

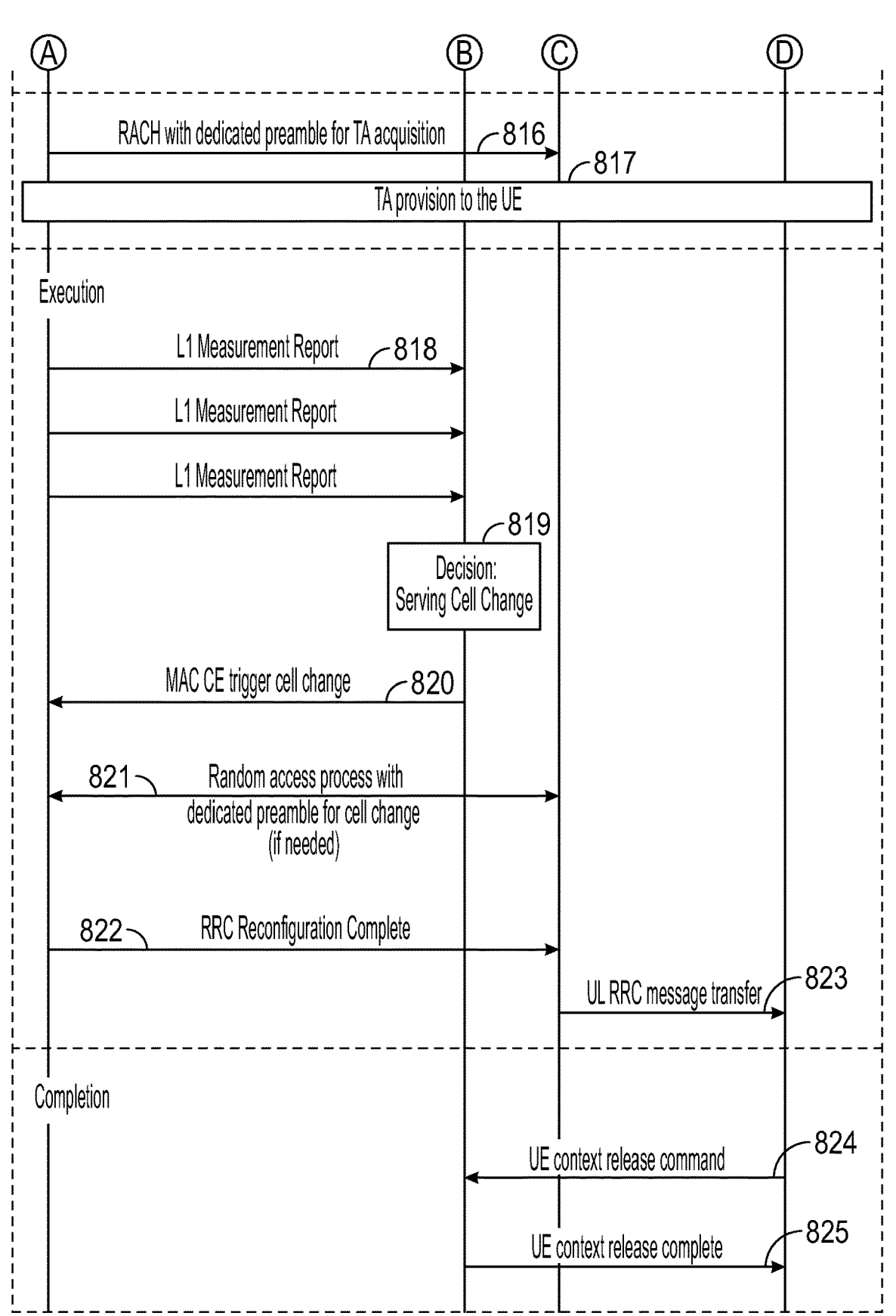

Ⓐ                    Ⓑ    Ⓒ                    Ⓓ

RACH with dedicated preamble for TA acquisition    816

817

TA provision to the UE

Execution

L1 Measurement Report    818

L1 Measurement Report

L1 Measurement Report

819

Decision:
Serving Cell Change

MAC CE trigger cell change    820

821    Random access process with
dedicated preamble for cell change
(if needed)

822    RRC Reconfiguration Complete

UL RRC message transfer    823

Completion

UE context release command    824

UE context release complete    825

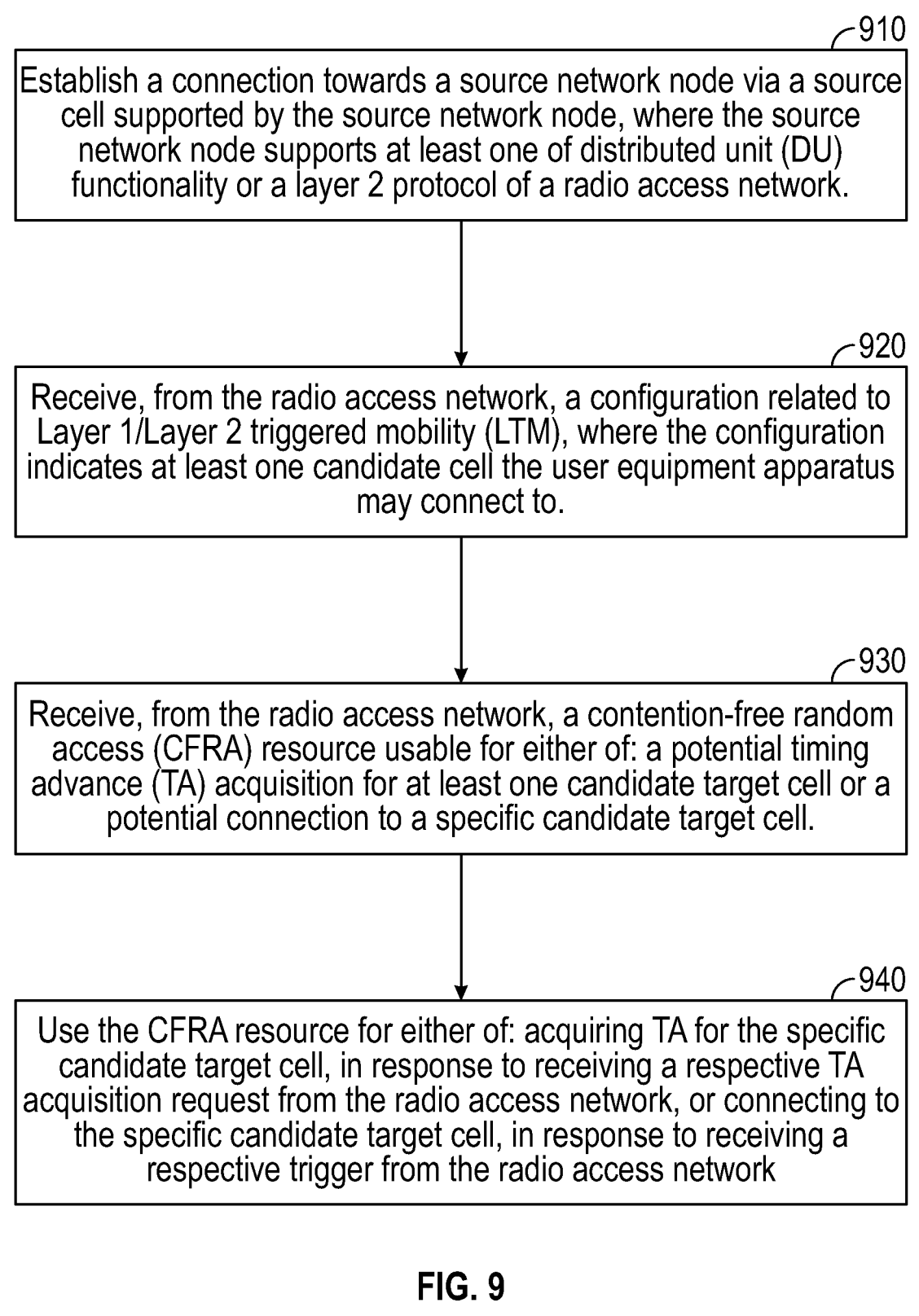

Establish a connection towards a source network node via a source cell supported by the source network node, where the source network node supports at least one of distributed unit (DU) functionality or a layer 2 protocol of a radio access network.

920

Receive, from the radio access network, a configuration related to Layer 1/Layer 2 triggered mobility (LTM), where the configuration indicates at least one candidate cell the user equipment apparatus may connect to.

930

Receive, from the radio access network, a contention-free random access (CFRA) resource usable for either of: a potential timing advance (TA) acquisition for at least one candidate target cell or a potential connection to a specific candidate target cell.

940

Use the CFRA resource for either of: acquiring TA for the specific candidate target cell, in response to receiving a respective TA acquisition request from the radio access network, or connecting to the specific candidate target cell, in response to receiving a respective trigger from the radio access network

FIG. 9

RANDOM ACCESS CONFUSION AVOIDANCE

FIELD

Various example embodiments relate generally to wireless networking and, more particularly, to random access procedure in wireless networking.

BACKGROUND

Wireless networking provides significant advantages for user mobility. A user's ability to remain connected while on the move provides advantages not only for the user, but also provides greater efficiency and productivity for society as a whole. As user expectations for connection reliability, data speed, and device battery life become more demanding, technology for wireless networking must also keep pace with such expectations. Accordingly, there is continuing interest in improving wireless networking technology.

SUMMARY

In accordance with aspects of the disclosure, a user equipment apparatus includes at least one processor and at least one memory storing instructions. The instructions, when executed by the at least one processor, cause the user equipment apparatus at least to: establish a connection towards a source network node via a source cell supported by the source network node, where the source network node supports at least one of distributed unit (DU) functionality or a layer 2 protocol of a radio access network; receive, from the radio access network, a configuration related to Layer 1/Layer 2 triggered mobility (LTM), where the configuration indicates at least one candidate cell the user equipment apparatus may connect to: receive, from the radio access network, a contention-free random access (CFRA) resource usable for either of: a potential timing advance (TA) acquisition for at least one candidate target cell or a potential connection to a specific candidate target cell; and use the CFRA resource for either of: acquiring TA for the specific candidate target cell, in response to receiving a respective TA acquisition request from the radio access network, or connecting to the specific candidate target cell, in response to receiving a respective trigger from the radio access network.

In an aspect of the user equipment apparatus, receiving the CFRA resource may include receiving, from the source network node, a physical downlink control channel (PDCCH) order specifying the CFRA resource, where the PDCCH order relates at least to TA acquisition.

In an aspect of the user equipment apparatus, receiving the CFRA resource may include receiving, from the source network node, a media access control-control element (MAC-CE) specifying the CFRA resource, where the MAC-CE relates at least to handover.

In an aspect of the user equipment apparatus, the instructions, when executed by the at least one processor, may further cause the user equipment apparatus at least to: establish a connection with a control network node which supports at least one of central unit-control plane (CU-CP) functionality or a layer 3 protocol of a radio access network, wherein receiving the CFRA resource includes receiving, from the control network node, a radio resource control (RRC) reconfiguration message specifying the CFRA resource.

In an aspect of the user equipment apparatus, the instructions, when executed by the at least one processor, may cause the user equipment apparatus at least to: in case the CFRA resource is used for acquiring TA for the specific candidate target cell, receive a random access response (RAR) including TA information but having no uplink grant for a RRC reconfiguration complete message.

In an aspect of the user equipment apparatus, the instructions, when executed by the at least one processor, may further cause the user equipment apparatus at least to: start a timer after receiving the TA acquisition request, where the CFRA resource is used for acquiring TA for the specific candidate target cell after the timer expires.

In an aspect of the user equipment apparatus, the instructions, when executed by the at least one processor, may further cause the user equipment apparatus at least to: in case the CFRA resource is used for connecting to the specific target candidate cell, receive a random access response (RAR) that includes TA information and an uplink grant for a RRC reconfiguration complete message.

In an aspect of the user equipment apparatus, the instructions, when executed by the at least one processor, may further cause the user equipment apparatus at least to: start a timer after receiving the trigger, where the CFRA resource is used for connecting to the specific candidate target cell after the timer expires.

In accordance with aspects of the present disclosure, a processor-implemented method in a user equipment apparatus includes: establishing a connection towards a source network node via a source cell supported by the source network node, where the source network node supports at least one of distributed unit (DU) functionality or a layer 2 protocol of a radio access network; receiving, from the radio access network, a configuration related to Layer 1/Layer 2 triggered mobility (LTM), where the configuration indicates at least one candidate cell the user equipment apparatus may connect to: receiving, from the radio access network, a contention-free random access (CFRA) resource usable for either of: a potential timing advance (TA) acquisition for at least one candidate target cell or a potential connection to a specific candidate target cell; and using the CFRA resource for either of: acquiring TA for the specific candidate target cell, in response to receiving a respective acquisition request from the radio access network, or connecting to the specific candidate target cell, in response to receiving a respective trigger from the radio access network.

In an aspect of the processor-implemented method, receiving the CFRA resource may include receiving, from the source network node, a physical downlink control channel (PDCCH) order specifying the CFRA resource, where the PDCCH order relates at least to TA acquisition.

In an aspect of the processor-implemented method, receiving the CFRA resource may include receiving, from the source network node, a media access control-control element (MAC-CE) specifying the CFRA resource, where the MAC-CE relates at least to handover.

In an aspect of the processor-implemented method, the processor-implemented method may further include: establishing a connection with a control network node which supports at least one of central unit-control plane (CU-CP) functionality or a layer 3 protocol of a radio access network, where receiving the CFRA resource includes receiving, from the control network node, a radio resource control (RRC) reconfiguration message specifying the CFRA resource.

In an aspect of the processor-implemented method, the candidate target cell may be supported by a target network node which supports at least one of distributed unit (DU)

functionality or a layer 2 protocol of a radio access network. The processor-implemented method further includes, in case the CFRA resource is used for acquiring TA for the specific candidate target cell, receiving a random access response (RAR) that includes TA information but having no uplink grant for a RRC reconfiguration complete message.

In an aspect of the processor-implemented method, the processor-implemented method of claim 11, further includes: starting a timer after receiving the TA acquisition request, where the CFRA resource is used for acquiring TA for the specific candidate target cell after the timer expires.

In an aspect of the processor-implemented method, the candidate target cell may be supported by a target network node which supports at least one of distributed unit (DU) functionality or a layer 2 protocol of a radio access network. The processor-implemented method further includes: in case the CFRA resource is used for connecting to the specific target candidate cell, receiving a random access response (RAR) that includes TA information and an uplink grant for a RRC reconfiguration complete message.

In an aspect of the processor-implemented method, the processor-implemented may further include: starting a timer after receiving the trigger, where the CFRA resource is used for connecting to the specific candidate target cell after the timer expires.

In accordance with aspects of the present disclosure, a network node supports at least one of distributed unit (DU) functionality or a layer 2 protocol of a radio access network and supports a candidate target cell with which a user equipment apparatus (UE) may connect. The network node includes at least one processor and at least one memory storing instructions. The instructions, when executed by the at least one processor, cause the network node at least to: allocate a contention-free random access (CFRA) resource usable for either of: a potential timing advance (TA) acquisition for the candidate target cell by the UE or a potential connection to the candidate target cell by the UE; and transmit, towards a control network node supporting at least one of central unit-control plane (CU-CP) functionality or a layer 3 protocol of a radio access network, information specifying the CFRA resource.

In an aspect of the network node, the UE is served by a serving cell that is supported by a source network node which supports at least one of distributed unit (DU) functionality or a layer 2 protocol of a radio access network, and the instructions, when executed by the at least one processor, may further cause the network node at least to: receive, from the UE, a random access preamble corresponding to the allocated CFRA resource; in case of receiving a message, from the source network node, indicating the UE was triggered to perform the TA acquisition for the candidate target cell, transmit a random access response that includes TA information but having no uplink grant for a RRC reconfiguration complete message; and in case of not receiving a message, from the source network node, indicating the UE was triggered to perform the TA acquisition for the candidate target cell, transmit a random access response that includes TA information and an uplink grant for a RRC reconfiguration complete message.

In an aspect of the network node, the instructions, when executed by the at least one processor, may further cause the network node at least to: start a timer after receiving the random access preamble; and after the timer expires, determine whether a message, from the source network node, indicating the UE was triggered to perform the TA acquisition for the candidate target cell, was received.

In an aspect of the network node, the UE is served by a serving cell that is supported by a source network node which supports at least one of distributed unit (DU) functionality or a layer 2 protocol of a radio access network, and the instructions, when executed by the at least one processor, may further cause the network node at least to: receive, from the UE, a random access preamble corresponding to the allocated CFRA resource; in case of receiving a message, from the source network node, indicating the UE was triggered to connect to the candidate target cell, transmit a random access response that includes TA information and an uplink grant for a RRC reconfiguration complete message; and in case of not receiving a message, from the source network node, indicating the UE was triggered to connect to the candidate target cell, transmit a random access response that includes TA information but having no uplink grant for a RRC reconfiguration complete message.

In an aspect of the network node, the instructions, when executed by the at least one processor, may further cause the network node at least to: start a timer after receiving the random access preamble; and after the timer expires, determine whether a message, from the source network node, indicating the UE was triggered to connect to the candidate target cell, was received.

In accordance with aspects of the present disclosure, a processor-implemented method includes: providing, for a candidate target node, at least one of distributed unit (DU) functionality or a layer 2 protocol of a radio access network; allocating a CFRA resource usable for either of: a potential timing advance (TA) acquisition for the candidate target cell by a user equipment apparatus (UE) or a potential connection to the candidate target cell by the UE; and transmitting, towards a control network node supporting at least one of central unit-control plane (CU-CP) functionality or a layer 3 protocol of a radio access network, information specifying the CFRA resource.

In an aspect of the processor-implemented method, the UE is served by a serving cell that is supported by a source network node which supports at least one of distributed unit (DU) functionality or a layer 2 protocol of a radio access network. The processor-implemented method may further include: receiving, from the UE, a random access preamble corresponding to the allocated CFRA resource; in case of receiving a message, from the source network node, indicating the UE was triggered to perform the TA acquisition for the candidate target cell, transmitting a random access response that includes TA information but having no uplink grant for a RRC reconfiguration complete message; and in case of not receiving a message, from the source network node, indicating the UE was triggered to perform the TA acquisition for the candidate target cell, transmitting a random access response that includes TA information and an uplink grant for a RRC reconfiguration complete message.

In an aspect of the processor-implemented method, may further include: starting a timer after receiving the random access preamble; and after the timer expires, determining whether a message, from the source network node, indicating the UE was triggered to perform the TA acquisition for the candidate target cell, was received.

In an aspect of the processor-implemented method, the UE is served by a serving cell that is supported by a source network node which supports at least one of distributed unit (DU) functionality or a layer 2 protocol of a radio access network. The processor-implemented method may further include: receiving, from the UE, a random access preamble corresponding to the allocated CFRA resource; in case of receiving a message, from the source network node, indicating the UE was triggered to connect to the candidate target cell, transmitting a random access response that includes TA information and an uplink grant for a RRC reconfiguration complete message; and in case of not receiving a message, from the source network node, indicating the UE was triggered to connect to the candidate target cell, transmitting a random access response that includes TA information but having no uplink grant for a RRC reconfiguration complete message.

In an aspect of the processor-implemented method, the processor-implemented may further include: starting a timer after receiving the random access preamble; and after the timer expires, determining whether a message, from the source network node, indicating the UE was triggered to connect to the candidate target cell, was received.

According to some aspects, there is provided the subject matter of the independent claims. Some further aspects are defined in the dependent claims.

BRIEF DESCRIPTION OF THE DRAWINGS

Some example embodiments will now be described with reference to the accompanying drawings.

FIGS. 8A, 8B, 8C, 8D, 8E and 8F are diagrams of yet other example embodiments of signals and operations among a UE, a CU, a source DU, a target DU, according to one illustrated aspect of the disclosure; and FIG. 9 is a flow diagram of an example operation of a UE, according to one illustrated aspect of the disclosure.

DETAILED DESCRIPTION

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Aspects or embodiments described in the present disclosure may be implemented in wireless networking apparatuses, such as, without limitation, apparatuses utilizing Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, enhanced LTE (eLTE), 5G New Radio (5G NR), and 802.11ax (Wi-Fi 6), among other wireless networking systems. The term 'eLTE' here denotes the LTE evolution that connects to a 5G core. LTE is also known as evolved UMTS terrestrial radio access (EUTRA) or as evolved UMTS terrestrial radio access network (EUTRAN).

Aspects of the present disclosure relate to random access (RA) procedure and to avoiding confusion about the purpose of an RA procedure, e.g., RA procedure for acquiring timing advance (TA) or RA procedure for switching cells, etc. Aspects of the present disclosure provide various advantages, including, for example, saving resources by providing an appropriate random access response based on the purpose of an RA procedure.

As used herein, the terms "transmit towards", "receive from", "cooperate with", and "coordinate with" (and their variations), include communications that may or may not involve communications through one or more intermediate devices or nodes. The term "acquire" (and its variations) includes acquiring in the first instance or reacquiring after the first instance. The term "connection" may mean a physical connection or a logical connection.

Figure 1:
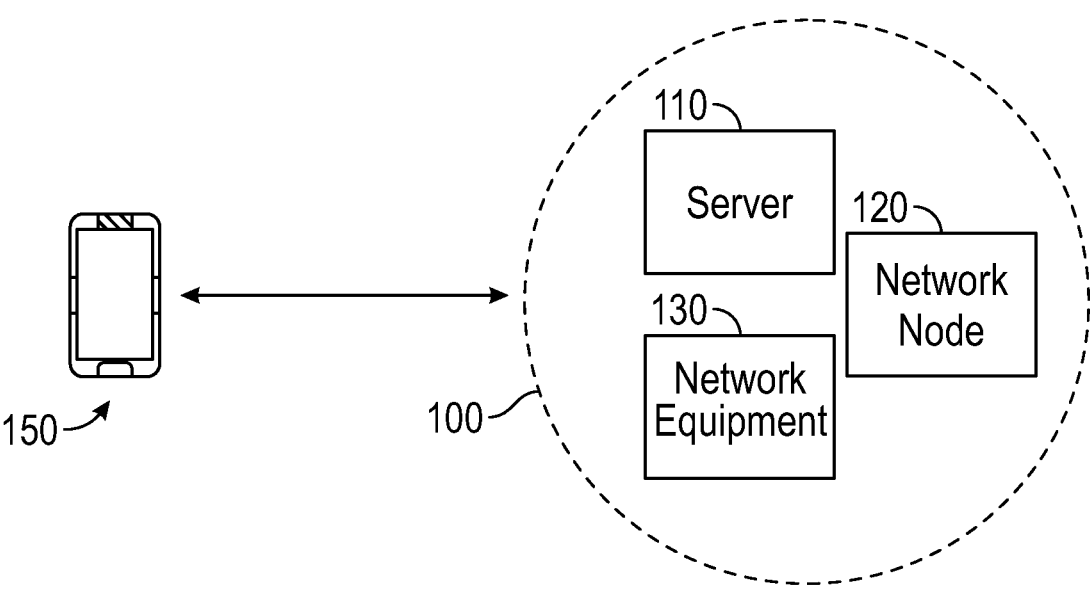
FIG. 1 is a diagram of an example embodiment of wireless networking between a network system and a user equipment apparatus (UE), according to one illustrated aspect of the disclosure.

FIG. 1 is a diagram depicting an example of wireless networking between a network system 100 and a user equipment apparatus (UE) 150. The network system 100, for example, may include one or more network nodes 120, one or more servers 110, and/or one or more network equipment 130 (e.g., test equipment). The network nodes 120 will be described in more detail below. As used herein, the term "network apparatus" may refer to any component of the network system 100, such as the server 110, the network node 120, the network equipment 130, any component(s) of the foregoing, and/or any other component(s) of the network system 100. Examples of network apparatuses include, without limitation, apparatuses implementing 5G NR and apparatuses implementing Wi-Fi 6, among others. The present disclosure describes embodiments related to 5G NR and embodiments that involve aspects defined by 3rd Generation Partnership Project (3GPP). However, it is contemplated that embodiments relating to other wireless networking technologies are encompassed within the scope of the present disclosure.

The following description provides further details of examples of network nodes. In a 5G NR network, a gNodeB (also known as gNB) may include, e.g., a node that provides NR user plane and control plane protocol terminations towards the UE and that is connected via a NG interface to the 5G core (5GC), e.g., according to 3GPP TS 38.300 V16.6.0 (2021-06) section 3.2, which is hereby incorporated by reference herein.

A gNB supports various protocol layers, e.g., Layer 1 (L1)—physical layer, Layer 2 (L2), and Layer 3 (L3).

The layer 2 (L2) of NR is split into the following sublayers: Medium Access Control (MAC), Radio Link Control (RLC), Packet Data Convergence Protocol (PDCP) and Service Data Adaptation Protocol (SDAP), where, e.g.:

The physical layer offers to the MAC sublayer transport channels;

The MAC sublayer offers to the RLC sublayer logical channels;

The RLC sublayer offers to the PDCP sublayer RLC channels;

The PDCP sublayer offers to the SDAP sublayer radio bearers;

The SDAP sublayer offers to 5GC quality of service (QoS) flows;

"Comp." refers to header compression and "Segm." refers to segmentation;

Control channels include broadcast control channel (BCCH) and physical control channel (PCCH).

Layer 3 (L3) includes e.g., radio resource control (RRC), e.g., according to 3GPP TS 38.300 V16.6.0 (2021-06) section 6, which is hereby incorporated by reference herein.

A gNB central unit (gNB-CU) includes, e.g., a logical node hosting, e.g., radio resource control (RRC), service data adaptation protocol (SDAP), and packet data convergence protocol (PDCP) protocols of the gNB or RRC and PDCP protocols of the en-gNB, that controls the operation of one or more gNB distributed units (gNB-DUs). The gNB-CU terminates the F1 interface connected with the gNB-DU. A gNB-CU may also be referred to herein as a CU, a central unit, a centralized unit, or a control unit.

A gNB Distributed Unit (gNB-DU) includes, e.g., a logical node hosting, e.g., radio link control (RLC), media access control (MAC), and physical (PHY) layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU. A gNB-DU may also be referred to herein as DU or a distributed unit.

A gNB-CU-Control Plane (gNB-CU-CP) includes, e.g., a logical node hosting, e.g., the RRC and the control plane part of the PDCP protocol of the gNB-CU for an en-gNB or a gNB. The gNB-CU-CP terminates the E1 interface connected with the gNB-CU-User Plane (gNB-CU-UP) and the F1-C interface connected with the gNB-DU.

A gNB-CU-User Plane (gNB-CU-UP) includes, e.g., a logical node hosting, e.g., the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU, e.g., according to 3GPP TS 38.401 V16.6.0 (2021-07) section 3.1, which is hereby incorporated by reference herein.

Different functional splits between the central and distributed unit are possible, e.g., called options:

Option 1 (1A-like split):
The function split in this option is similar to the 1A architecture in dual connectivity (DC). RRC is in the central unit. PDCP, RLC, MAC, physical layer, and RF are in the distributed unit.

Option 2 (3C-like split):
The function split in this option is similar to the 3C architecture in DC. RRC and PDCP are in the central unit. RLC, MAC, physical layer, and RF are in the distributed unit.

Option 3 (intra RLC split):
Low RLC (partial function of RLC), MAC, physical layer, and RF are in the distributed unit. PDCP and high RLC (the other partial function of RLC) are in the central unit.

Option 4 (RLC-MAC split):
MAC, physical layer, and RF are in the distributed unit. PDCP and RLC are in the central unit.

Or else, e.g., according to 3GPP TR 38.801 V14.0.0 (2017-03) section 11, which is incorporated by reference herein.

As used herein, the term "network node" may refer to any of a gNB, a gNB-CU, a gNB-DU, a gNB-CU-CP, or a gNB-CU-UP, or any combination of them.

A RAN (radio access network) node or network node such as, e.g. a gNB, base station, gNB-CU, or gNB-DU, or parts thereof, may be implemented using, e.g., an apparatus with at least one processor and/or at least one memory with processor-readable instructions ("program") configured to support and/or provision and/or process CU and/or DU related functionality and/or features, and/or at least one protocol (sub-)layer of a RAN (radio access network), e.g. layer 2 and/or layer 3. An example of such an apparatus and components will be described in connection with FIG. 2 below.

The gNB-CU and gNB-DU parts may, e.g., be co-located or physically separated. The gNB-DU may even be split further, e.g., into two parts, e.g., one including processing equipment and one including an antenna. A central unit (CU) may also be called BBU/REC/RCC/C-RAN/V-RAN, O-RAN, or part thereof. A distributed unit (DU) may also be called RRH/RRU/RE/RU, or part thereof. Hereinafter, in various example embodiments of the present disclosure, a network node, which supports at least one of central unit control plane functionality or a layer 3 protocol of a radio access network, may be, e.g., a gNB-CU-CP. Similarly, a network node, which supports at least one of distributed unit functionality or a layer 2 protocol of the radio access network, may be, e.g., a gNB-DU.

A gNB-CU may support one or multiple gNB-DUs. A gNB-DU may support one or multiple cells and, thus, could support a serving cell for a user equipment apparatus (UE) or support a candidate cell for handover, dual connectivity, and/or carrier aggregation, among other procedures. Examples of such procedures will be described below in connection with FIG. 3 and FIG. 4.

The user equipment apparatus (UE) 150 may be or include a wireless or mobile device, an apparatus with a radio interface to interact with a RAN (radio access network), a smartphone, an in-vehicle apparatus, an IoT device, or a M2M device, among other types of user equipment. Such UE 150 may include: at least one processor; and at least one memory including program code; where the at least one memory and the computer program code are configured to, with the at least one processor, cause the apparatus at least to perform certain operations, such as, e.g., RRC connection to the RAN. An example of components of a UE will be described in connection with FIG. 2. In embodiments, the UE 150 may be configured to generate a message (e.g., including a cell ID) to be transmitted via radio towards a RAN (e.g., to reach and communicate with a serving cell). In embodiments, the UE 150 may generate and transmit and receive RRC messages containing one or more RRC PDUs (packet data units). Persons skilled in the art will understand RRC protocol as well as other procedures a UE may perform.

With continuing reference to FIG. 1, in the example of a 5G NR network, the network system 100 provides a cell, which defines a coverage area of the network system 100. As described above, the network system 100 may include a gNB of a 5G NR network or may include any other apparatus configured to control radio communication and manage radio resources within a cell. As used herein, the term "resource" may refer to radio resources, such as a resource block (RB), a physical resource block (PRB), a radio frame, a subframe, a time slot, a sub-band, a frequency region, a sub-carrier, a beam, etc. In embodiments, the network node 120 may be called a base station.

FIG. 1 provides an example and is merely illustrative of a network system 100 and a UE 150. Persons skilled in the art will understand that the network system 100 includes components not illustrated in FIG. 1 and will understand that other user equipment apparatuses may be in communication with the network system 100.

Figure 2:
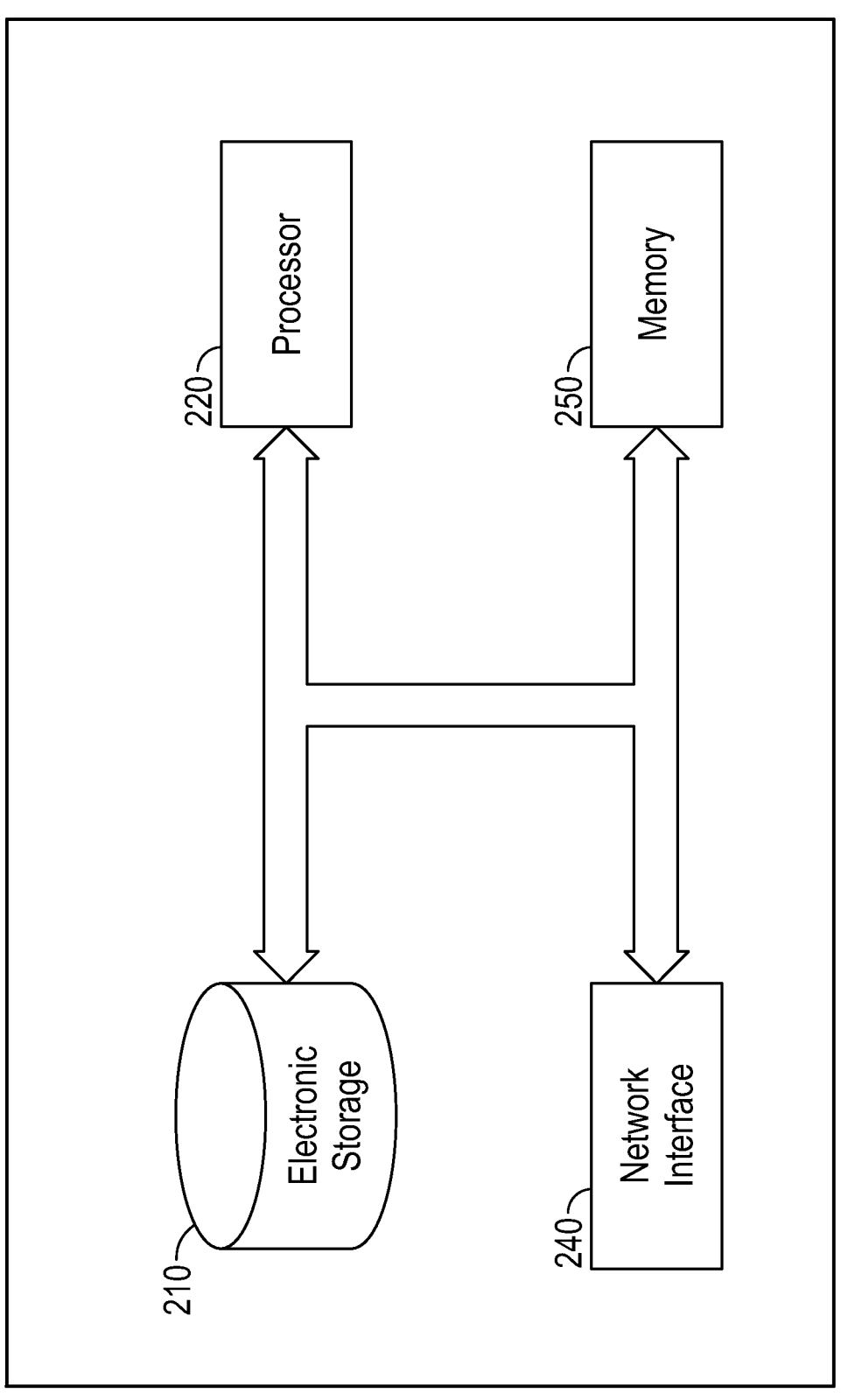
FIG. 2 is a diagram of an example embodiment of components of an apparatus, according to one illustrated aspect of the disclosure.

Referring now to FIG. 2, there is shown a block diagram of example components of a UE or a network apparatus. The apparatus includes an electronic storage 210, a processor 220, a memory 250, and a network interface 240. The various components may be communicatively coupled with each other. The processor 220 may be and may include any type of processor, such as a single-core central processing unit (CPU), a multi-core CPU, a microprocessor, a digital signal processor (DSP), a System-on-Chip (SoC), or any other type of processor. The memory 250 may be a volatile type of memory, e.g., RAM, or a non-volatile type of memory, e.g., NAND flash memory. The memory 250 includes processor-readable instructions that are executable by the processor 220 to cause the apparatus to perform various operations, including those mentioned herein.

The electronic storage 210 may be and include any type of electronic storage used for storing data, such as hard disk drive, solid state drive, and/or optical disc, among other types of electronic storage. The electronic storage 210 stores processor-readable instructions for causing the apparatus to perform its operations and stores data associated with such operations, such as storing data relating to 5G NR standards, among other data. The network interface 240 may implement wireless networking technologies such as 5G NR, Wi-Fi 6, and/or other wireless networking technologies.

The components shown in FIG. 2 are merely examples, and persons skilled in the art will understand that an apparatus includes other components not illustrated and may include multiples of any of the illustrated components. Such and other embodiments are contemplated to be within the scope of the present disclosure.

Figure 3:
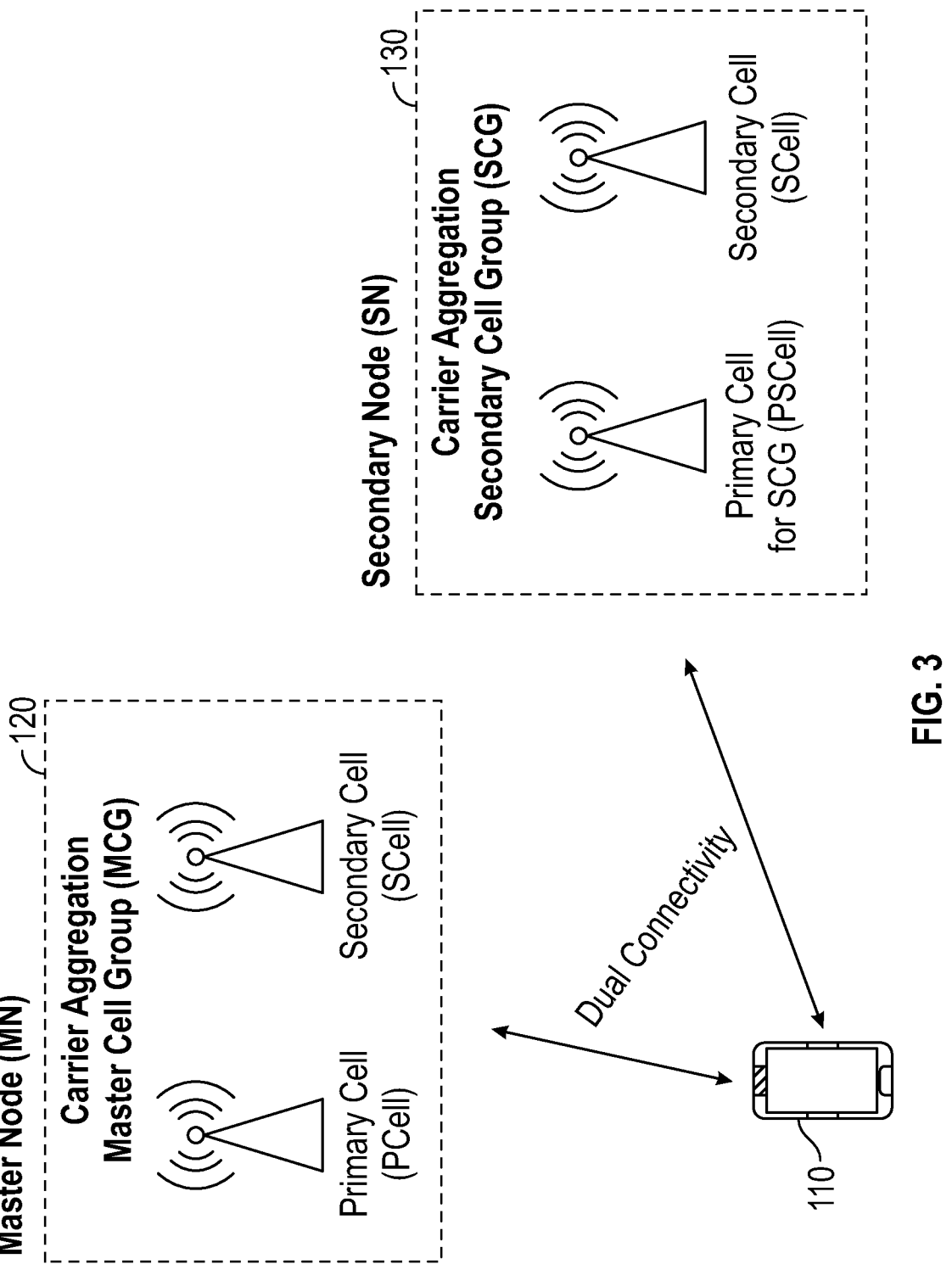
FIG. 3 is a diagram of an example embodiment of dual connectivity (DC) and carrier aggregation (CA), according to one illustrated aspect of the disclosure.

FIG. 3 is a diagram depicting an example of dual connectivity (DC) and carrier aggregation (CA). Dual connectivity allows a UE 310 to simultaneously connect to two network nodes, which may be referred to as a master node (MN) 320 and a secondary node (SN) 330. In embodiments, the MN 320 and/or the SN 330 may be a 5G New Radio (NR) node (e.g., gNB), among other types of nodes. In embodiments, the MN 320 and/or SN 330 may be base stations.

In embodiments, the MN 320 connects to a core network, such as a 5G core (5GC), and provides a control plane connection between a UE 310 and the core network, while the SN 330 connects to the MN 320 (e.g., via an Xn interface) and provides additional resources for user plane traffic. In embodiments, the MN 320 handles signaling messages, such as radio resource control (RRC) signaling messages. In embodiments, using signaling radio bearers (SRB) for 5G NR networks (e.g., SRB3), the SN 330 may handle signaling messages, such as RRC signaling messages, as well. Persons skilled in the art will understand RRC and SRB.

Carrier aggregation is illustrated in FIG. 3. While FIG. 3 shows carrier aggregation in conjunction with dual connectivity, carrier aggregation may be used without dual connectivity, as well. Carrier aggregation enables a UE 410 to simultaneously connect with multiple cells so as to operate at multiple frequencies at the same time. In embodiments, the multiple cells may be located at a single base station and/or at a common location (e.g., small cells or femtocells at a facility), among other possibilities. One or more cells that may be usable by a UE under carrier aggregation may be referred to as a "cell group." When carrier aggregation is used with dual connectivity, the master node and/or the secondary node may have a cell group. A cell group of a master node may be referred to as a master cell group (MCG), and a cell group of a secondary node may be referred to as a secondary cell group (SCG). As shown in FIG. 3, the MCG includes a primary cell (PCell) and may include one or more secondary cells (SCell). The SCG includes a primary cell of a secondary cell group (PSCell) and may include one or more secondary cells (SCell). Persons skilled in the art will understand the characteristics and functions of such cells and cell groups.

The example of FIG. 3 is merely illustrative of dual connectivity and carrier aggregation. The descriptions below may refer to dual connectivity and/or carrier aggregation. For example, in relation setting up dual connectivity, a cell which is a candidate for a PSCell may be referred to as a target cell, a candidate cell, or a target candidate cell, which may be used interchangeably. As another example, in relation to carrier aggregation, a cell which is a candidate for a SCell may also be referred to as a target cell, a candidate cell, or a target candidate cell. It will be understood that such references are not limited to the example illustrated in FIG. 3. Other arrangements different from FIG. 3 are contemplated to be within the scope of the present disclosure.

Figure 4:
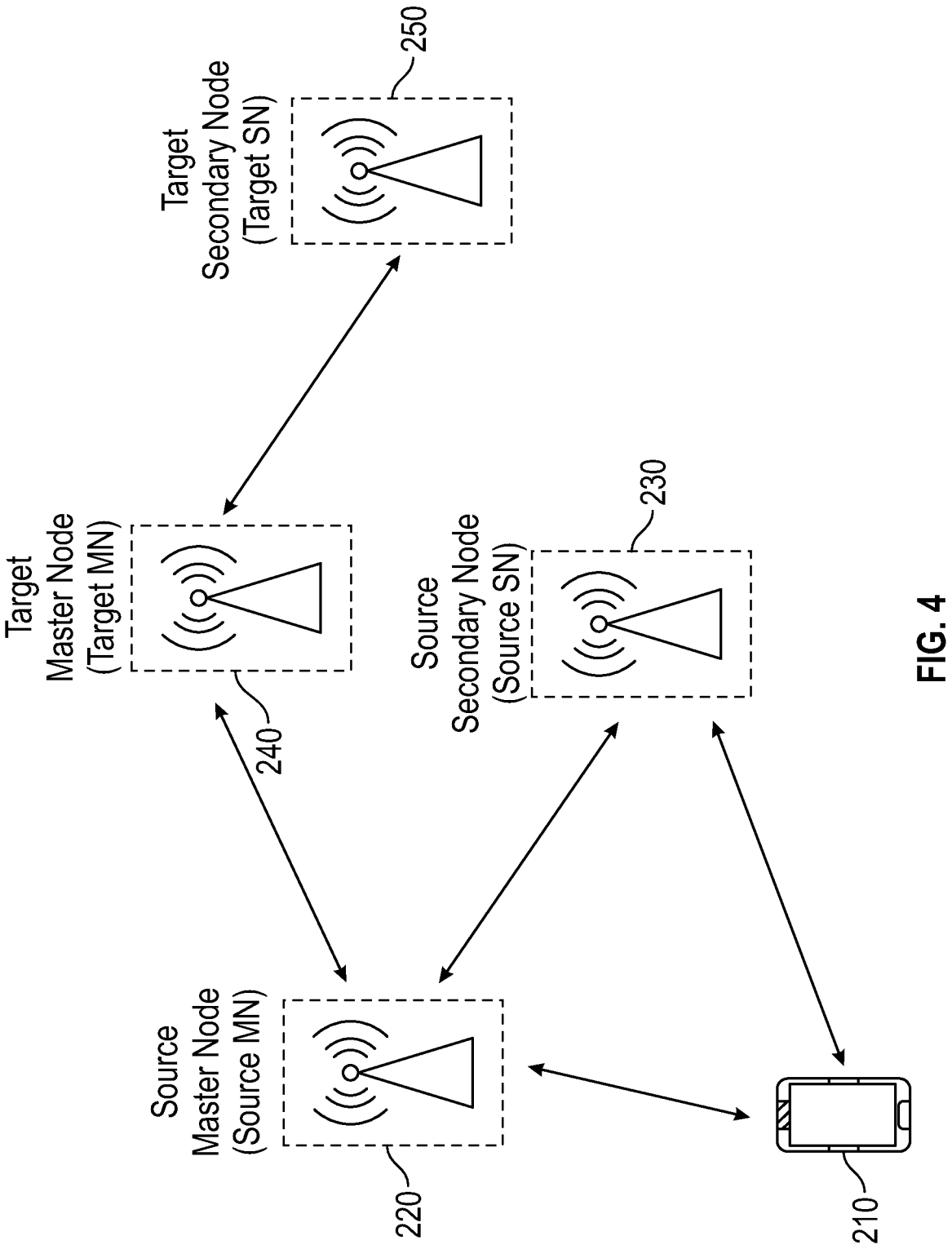
FIG. 4 is a diagram of an example embodiment of a handover procedure, according to one illustrated aspect of the disclosure.

FIG. 4 depicts an example of a handover scenario. Handover (HO) refers to a procedure that transitions the servicing of a UE from a source node and/or cell to a target node and/or cell. Handover may be performed, for example, when a UE transits between cells, among other scenarios. FIG. 4 shows a UE 410, a source MN 420, a source SN 430, a target MN 440, and a target SN 450.

The standards of 5G 3GPP (3rd Generation Partnership Project) Releases 15, 16, and 17 enhanced handover operations in various ways. Further enhancements are being developed under the term Layer 1/Layer 2 triggered mobility (LTM), which may also be referred to as L1/L2 triggered mobility, L1/2 inter-cell mobility, L1/2 handover, or lower layer (L1/2) mobility. These terms may be used interchangeably. A L1/L2 signal, message, or command sent by a network node to trigger a cell switch at the UE is referred as a "cell switch command." In LTM, the decision about a cell switch is based on L1 measurements and is made in the MAC layer in a distributed unit (DU). A cell switch command includes a MAC control element (MAC CE). The cell that is the target of a handover may be referred to herein as a target cell, a candidate cell, or a target candidate cell, which may be used interchangeably.

In the case of dual connectivity, a handover may involve a handover from a source MN 420 to a target MN 440, a handover from a source SN 430 to a target SN 450, a change of PCell within a MN, and/or a change of PSCell within a SN. In the case of dual connectivity, a handover to a target MN 440 may involve coordination with a target SN 450, as well. Specific standards that may be relevant include, without limitation, 3GPP TS 37.340) and TS 38.423.

The example of a handover depicted in FIG. 4 is merely illustrative. Variations are contemplated to be within the scope of the present disclosure.

FIG. 3 and FIG. 4 illustrate examples of operations and functionality that involve multiple network nodes and/or cells. Other operations and functionality may involve multiple nodes and/or cells, as well, such as multiple transmission and reception point (mTRP), fast handover, and dynamic point switching, among others. Such operations may involve a UE communicating with a target DU supporting a candidate target cell. A procedure for a UE to establish communications with a target DU is referred to as random access procedure. Random access procedure may be used for initial access, small data transmissions in inactive and transition from RRC_Inactive to RRC_Connected, as well as in beam failure recovery, connection re-establishment, handover, and cell addition, among other procedures which persons skilled in the art will recognize.

Figure 5:
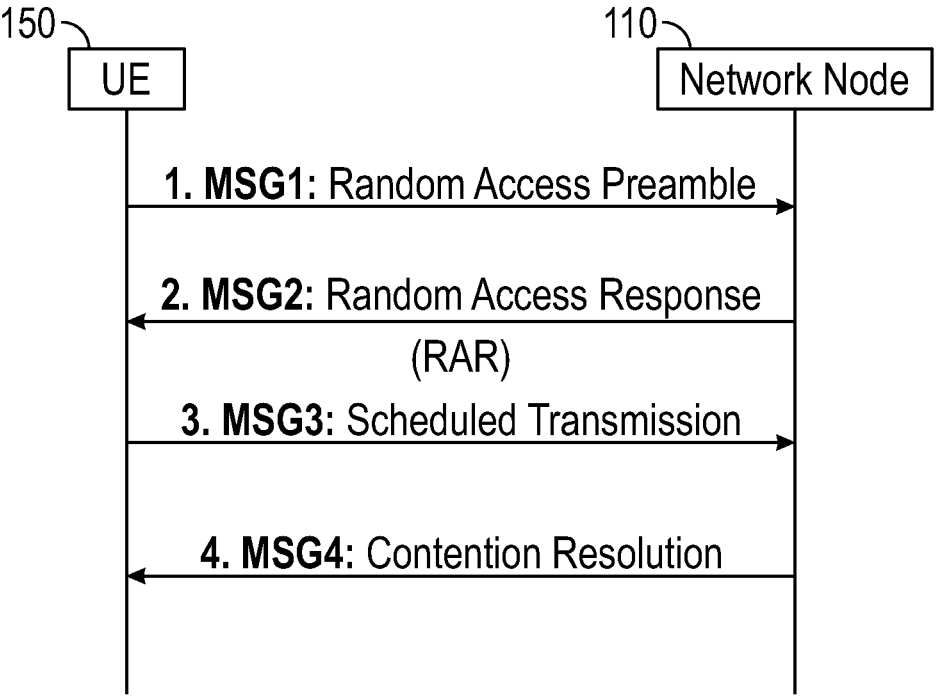
FIG. 5 is a diagram of an example embodiment of a contention-based random access procedure, according to one illustrated aspect of the disclosure.

Two types of random access procedures include contention-based random access (CBRA) and contention-free random access (CFRA). FIG. 5 is a diagram of an example of a contention-based random access (CBRA) procedure. In the illustrated example, the signals include a random access preamble (MSG1) transmitted by the UE 550 towards the network node 510, a random access response (MSG2) transmitted from the network node 510 towards the UE 550, a schedule transmission (MSG3) transmitted from the UE 550 towards the network node 510, and a contention resolution (MSG4) transmitted from the network node 510 towards the UE 550.

For MSG1, the UE 550 selects a usable random access preamble based on information elements in a signal synchronization block (SSB), which persons skilled in the art will understand. The UE 550 sends the random access preamble (MSG1) towards the network node 510 using a specific time and frequency resource known as random access occasion (RO). The UE 550 also provides an identity, called random access radio network temporary identity (RA-RNTI), to the network so that the network can address it in the next step.

For MSG2, the network node 110 detects the preamble, calculates various quantities, and sends a physical uplink shared channel (PUSCH) uplink (UL) grant towards the UE 550. This is called the random access response (RAR), which is sent as MSG2 addressed to the UE 550 with the relevant RA-RNTI and indicates to the UE 550 where in frequency and when in time it can transmit MSG3 on the PUSCH.

For MSG3, in response to receiving the MSG2 from the network node 510, the UE 550 sends MSG3 using the UL grant provided in the RAR. Because the RAR provides a time resource allocation, the UE 550 sends MSG3 towards the network node 510 at a timing specified by the time resource allocation and is a scheduled transmission. This MSG3 may be called a radio resource control (RRC) connection request message.

For MSG4, the network node 510 may send MSG4 towards the UE 550 for contention resolution. Contention resolution may operate in the manner specified by 3GPP for 5G NR. After the random access procedure, assuming contention resolution is resolved favorably, the UE 550 becomes connected to the network node 510. After establishing a connection, various procedures would be handled by a gNB-CU in accordance with the CU-DU split, such as the example splits described above. Other aspects of contention-based random access (CBRA) will be understood by persons skilled in the art.

Another type of random access procedure is contention-free random access (CFRA) (not shown). In general, for CFRA, the network node 510 provides a configuration that specifies one or more allocated random access preamble indices and random access occasions for each signal synchronization block (SSB). The network node 510 transmits the CFRA configuration, such as preamble index and random access occasion, towards the UE 550. The UE 550 receives the CFRA configuration and sends the random access preamble to the network node 510 in a random access request as MSG1. Then, MSG2 and MSG3 are similar to those described in connection with CBRA. No conflict resolution is needed in CFRA based on use of an allocated random access preamble. Other aspects of contention-free random access (CFRA) will be understood by persons skilled in the art.

In accordance with aspects of the present application, the present disclosure relates to random access procedure with respect to candidate target cells. A UE may initiate random access procedure with a candidate target cell for different procedures, such as for timing advance (TA) acquisition or for cell switch, among other procedures. Timing advance refers to information used by a UE to time its uplink transmissions towards a network node to arrive at the network node in alignment with a reception time window. This information may be referred to herein as a timing advance value or TA value, and the process of acquiring a timing advance value may be referred to herein as timing advance acquisition, TA acquisition, acquiring timing advance, or acquiring TA (or variations thereof). As described above herein, the term "acquire" (and its variations) includes acquiring in the first instance or reacquiring after the first instance. A UE that has longer propagation delay to a network node may have a larger TA value than a UE that has shorter propagation delay to the network node.

In embodiments, a UE may acquire a separate TA value for each candidate target cell. The TA value for a candidate target cell may be determined based on information provided by a DU supporting the candidate target cell, for example, in a MAC control element (MAC CE) or in a random access response (RAR).

In embodiments, a UE may acquire a TA value for a timing advance group (TAG). A timing advance group (TAG) is a group of serving cells that is configured by RRC and that, for the cells with a UL configured, use the same timing reference cell and the same timing advance value. A TAG containing a SpCell (which is a PCell+PSCell) of a MAC entity is referred to as a primary timing advance group (PTAG), whereas the term secondary timing advance group (STAG) refers to TAGs that do not include a SpCell.

Each TAG may include a time alignment timer (TAT), which controls how long a MAC entity considers the serving cells belonging to the associated TAG to be uplink time-aligned. A TAT may also be referred to as timeAlignmentTimer. Procedures for maintenance of uplink time alignment may involve 3GPP Specification 38.331, which may provide procedures for, e.g., when a timing advance command MAC CE is received, when a timing advance command is received in a random access response message for a serving cell belonging to a TAG or in a MSGB for an SpCell, when an absolute timing advance command is received in response to a MSGA transmission including C-RNTI MAC CE, when a timeAlignmentTimer expires when it is associated with a PTAG, and/or when a timeAlignmentTimer expires when it is associated with a STAG, among other procedures.

In embodiments, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding reference signal (SRS) based TA acquisition, receive timing difference based mechanisms (such as those in LTE), and/or UE-based TA measurement (including UE based TA measurement with one TAC from serving cell), among others. Such RA-based and non-RA-based methods for TA acquisition are within the scope of the present disclosure.

In accordance with aspects of the present disclosure, various approaches are provided to allow a candidate target cell to discern the purpose of a RA procedure that is initiated by a UE for the candidate target cell. For example, a UE may perform RA procedure to acquire TA for a candidate target cell and may separately perform RA procedure for a handover procedure to switch cell to the candidate target cell. In case the UE is performing RA procedure to acquire TA, the UE does not need uplink resources to transmit an RRC connection request. Therefore, the target DU would not need to allocate uplink resources, and the random access response (RAR) would not need to include a grant of uplink resources. In contrast, in case the UE is performing RA procedure to switch cell to the candidate target cell, the UE would need uplink resources to transmit an RRC connection request. Therefore, the target DU would need to allocate uplink resources, and the RAR would need to include a grant of the uplink resources.

Various approaches are described below in connection with FIGS. 6A-8F.

Figure 6A:
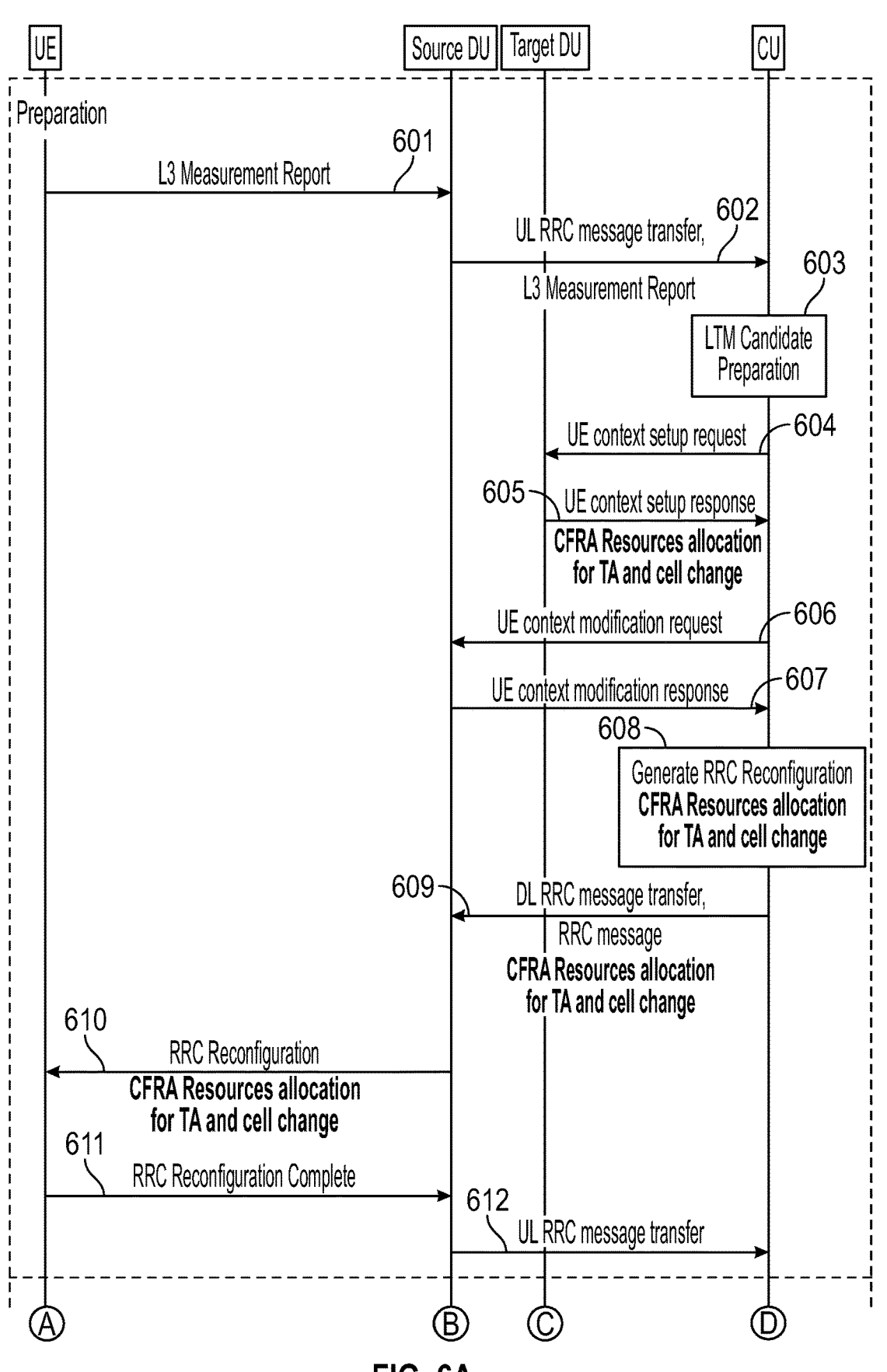
FIGS. 6A, 6B, 6C, 6D, 6E and 6F are diagrams of example embodiments of signals and operations among a UE, a central unit (CU), a source distributed unit (DU), and a target DU, according to one illustrated aspect of the disclosure.
Figure 6B:
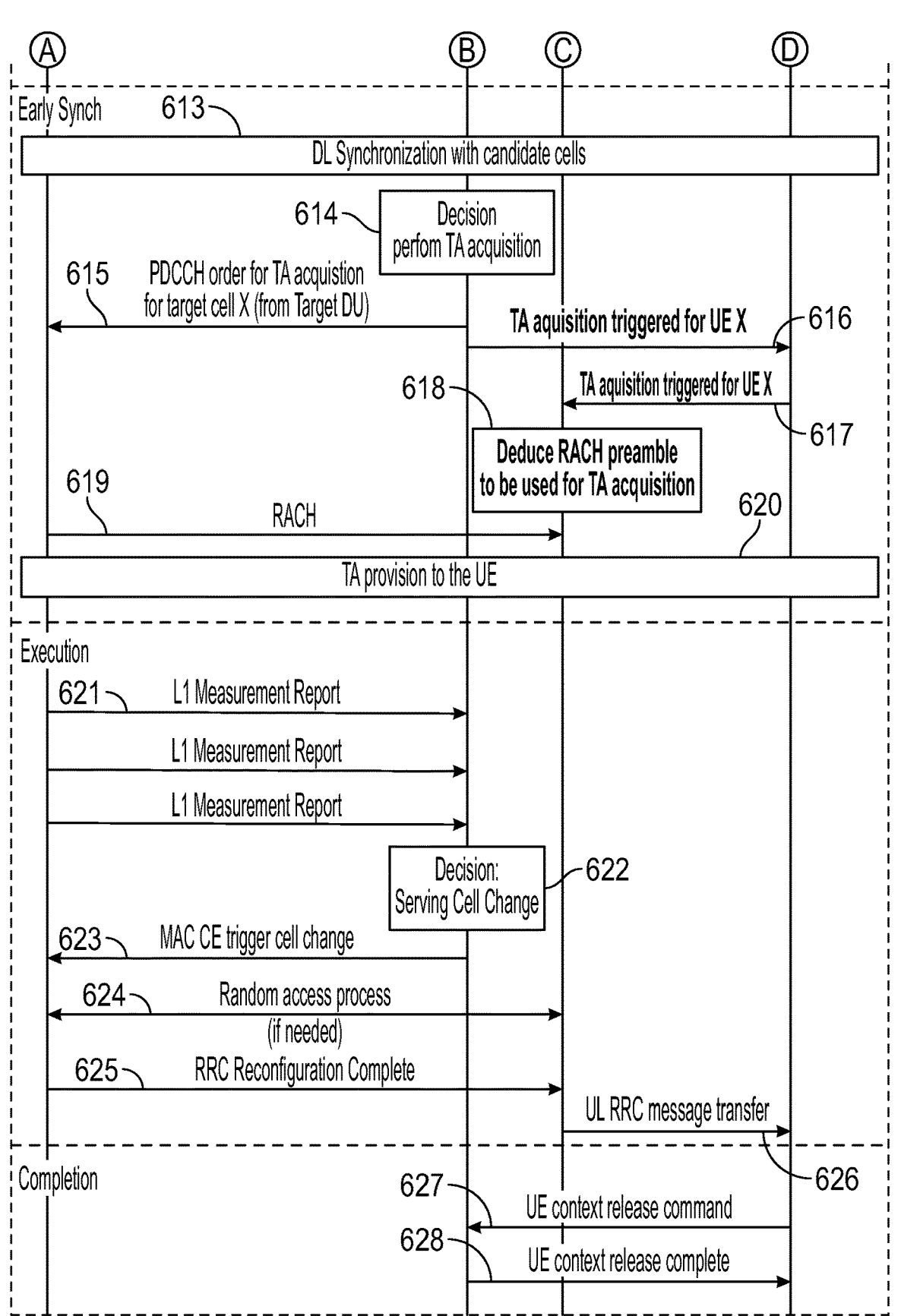

FIGS. 6A-6F relate to approaches in which a target DU allocates the same CFRA resource (e.g., RA preamble and occasion) for both TA acquisition and handover procedure, and the source DU is relied upon to inform the target DU (through one or more CU) when the UE uses the CFRA resource to perform TA acquisition. FIGS. 6A/6B illustrate one embodiment, FIG. 6C/6D illustrate a variation, and FIG. 6E/6F illustrate another variation.

Figure 7A:
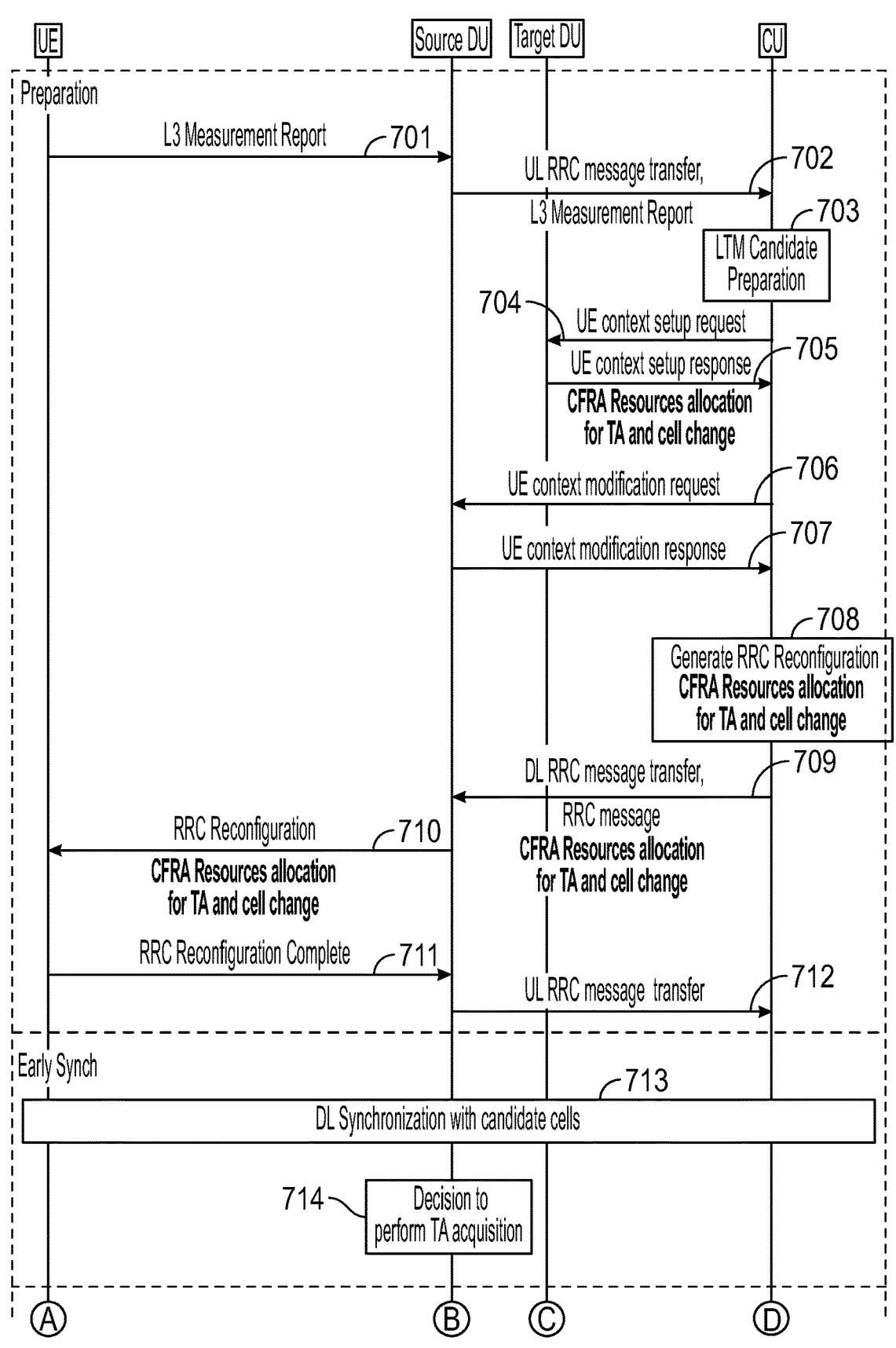
FIGS. 7A, 7B, 7C, 7D, 7E and 7F are diagrams of other example embodiments of signals and operations among a UE, a CU, a source DU, a target DU, according to one illustrated aspect of the disclosure.
Figure 7B:
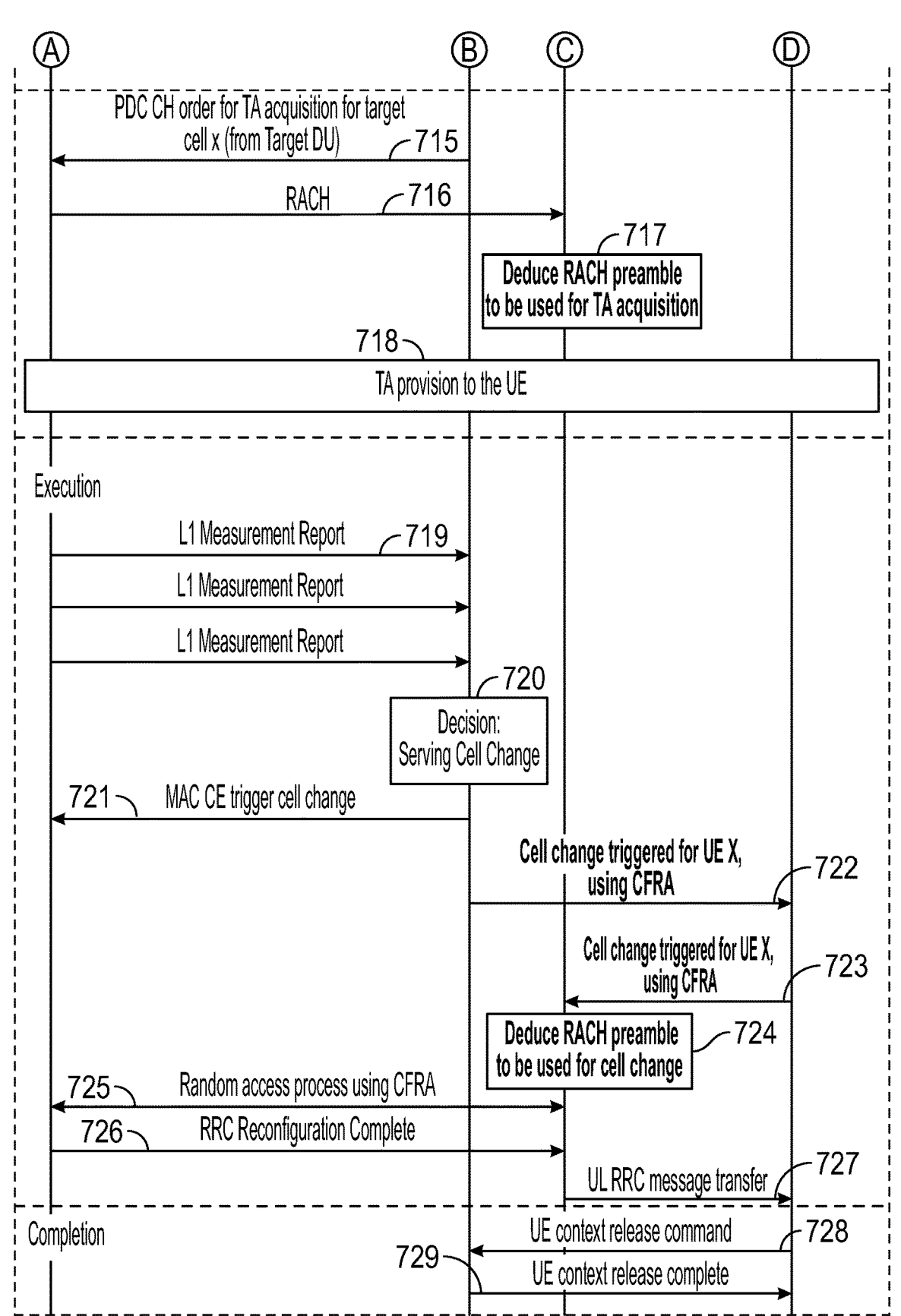

FIGS. 7A-7F relate to approaches in which a target DU allocates the same CFRA resource (e.g., RA preamble and occasion) for both TA acquisition and handover procedure, and the source DU is relied upon to inform the target DU (through one or more CU) when the UE uses the CFRA resource to perform handover procedure. FIGS. 7A/7B illustrate one embodiment, FIGS. 7C/7D illustrate a variation, and FIG. 7E/7F illustrate another variation.

Figure 8A:
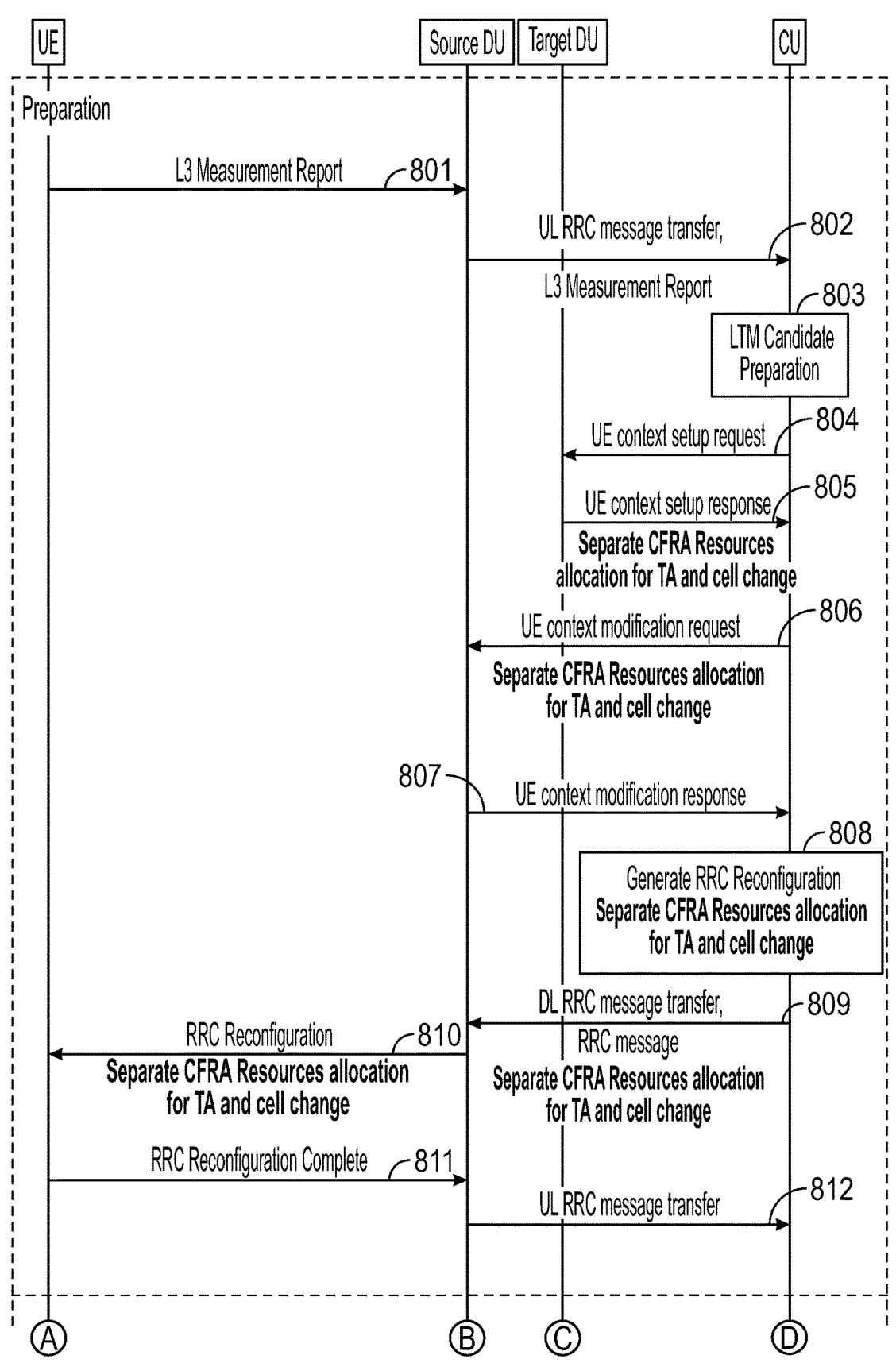
Figure 8B:
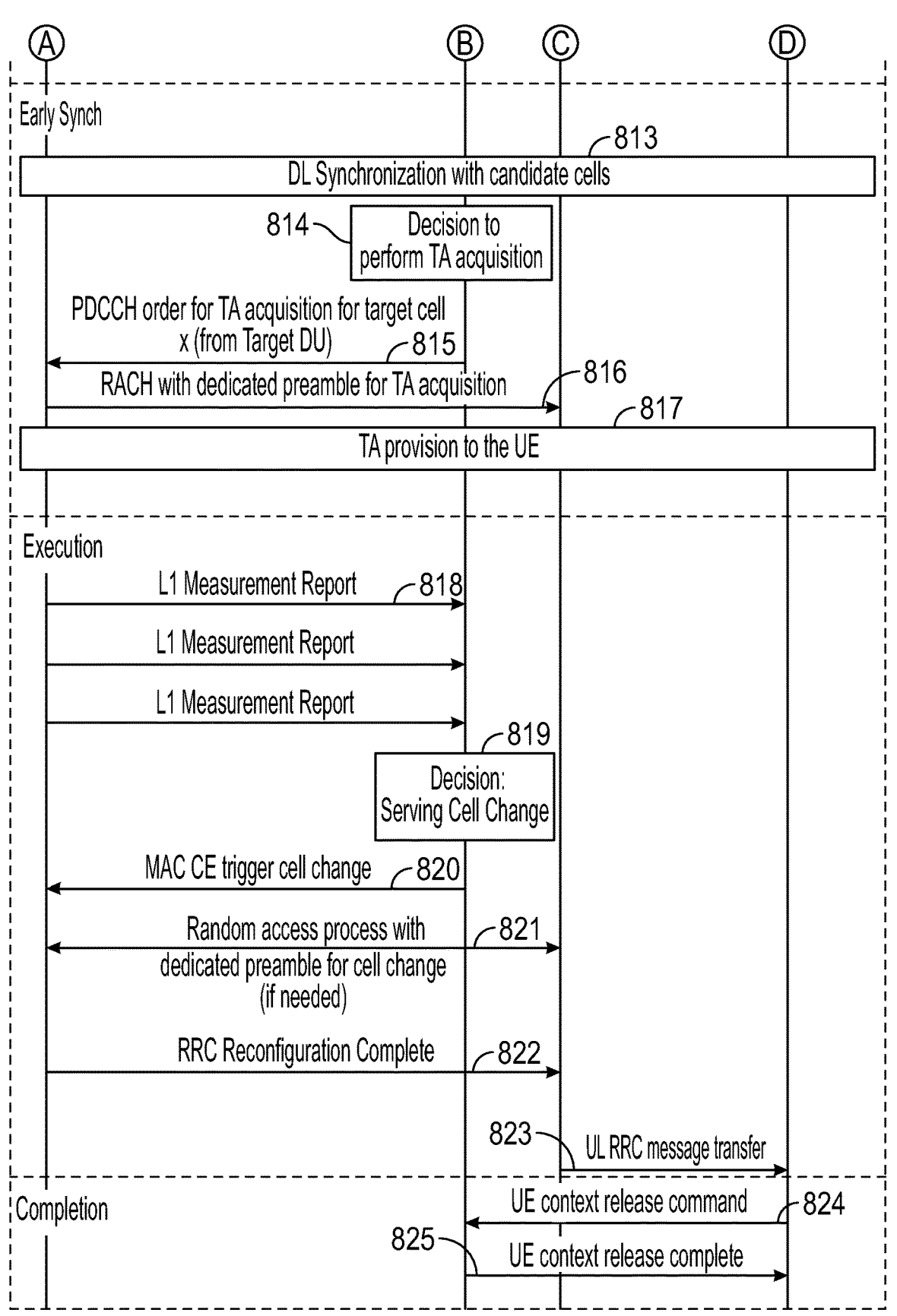

FIGS. 8A-8F relate to approaches in which a target DU allocates different CFRA resources (e.g., two RA preambles/occasions)—a first CFRA resource for TA acquisition and a second CFRA resource for handover procedure. FIGS. 8A/8B illustrate one embodiment, FIG. 8C/8D illustrate a variation, and FIG. 8E/8F illustrate another variation.

In the examples of FIGS. 6A-8F, TA acquisition and handover procedure are illustrated. The handover procedure is merely illustrative, and it is contemplated that aspects of the disclosed technology may be applied to other procedures involving TA acquisition, such as, without limitation, dual connectivity, carrier aggregation, mTRP, fast handover, and/or dynamic point switching, among others. Additionally, the inter-DU scenario is illustrative, and aspects of the present disclosure may be applied to intra-DU scenarios, as well. Where the source DU and target DU are supported by different CUs, the source DU may be supported by a source CU and the target DU may be supported by a target CU, which can communicate via an Xn interface. As mentioned above, the terms "transmit towards", "receive from", and "cooperate with" (and their variations), include communications that may or may not involve communications through one or more intermediate devices or nodes. It is intended that any description referring to a DU shall also be treated as though the description refers to a network node which supports at least one of DU functionality or a layer 2 protocol of a radio access network (RAN). It is intended that any description referring to a CU shall also be treated as though the description refers to a network node which supports at least one of CU functionality or a layer 3 protocol of a radio access network (RAN).

The paragraphs below describe various signals and operations. It will be understood that the described signals may have associated operations and the described operations may have associated signals. Accordingly, a described signal may also be an operation and a described operation may also be a signal.

The signals and operations are merely illustrative, and variations are contemplated to be within the scope of the present disclosure. In embodiments, variations may include other signals and operations not illustrated in any of FIGS. 6A-8F. In embodiments, variations may not include every signal and operation illustrated in any one figure. In embodiments, the signals and operations may be implemented in a different order than that illustrated in any of FIGS. 6A-8F. Such and other embodiments are contemplated to be within the scope of the present disclosure.

Referring now to FIGS. 6A-6F, and as mentioned above, the illustrations show an approach in which a target DU/candidate target cell allocates the same CFRA resource (e.g., RA preamble and occasion) for both TA acquisition and handover procedure, and the source DU is relied upon to inform the target DU (through one or more CU) when the UE uses the CFRA resource to perform TA acquisition.

Referring now to FIG. 6A/6B, example signals and operations are shown in which the same CFRA resource is allocated for both TA acquisition and handover procedure, and the CFRA resource is specified to the UE in an RRC message.

Prior to signal 601, the UE has established a connection with a DU (i.e., source DU) that supports the serving cell which serves the UE and has established a (logical) connection with the CU that supports the DU.

For signal 601, the UE transmits an L3 measurement report towards the source DU, and the source DU receives the L3 measurement report from the UE. Persons skilled in the art will understand an L3 measurement report, which may include averaged measurement samples of reference signals for a serving cell, for example. An L3 measurement report may indicate, for example, that a UE is nearing an edge of a cell and, thus, handover procedures should be initiated. For signal 602, the source DU forwards the L3 measurement report using uplink (UL) RRC message transfer by transmitting the L3 measurement report towards the CU, and the CU receives the L3 measurement report from the source DU. For operation 603, the CU performs a handover (HO) decision, based on the L3 measurement report, about whether a handover should be prepared. For the illustrated embodiment, the CU decides that an LTM handover should be prepared and identifies candidate target cells for the handover. In the illustration, the target DU is identified as supporting one or more of the candidate target cells.

For signal 604, the CU transmits a UE context setup request towards the target DU to prepare the target DU for handover by setting up the UE context in the target DU. The target DU receives the UE context setup request from the CU and sets up the UE context. For signal 605, the target DU provides an acknowledgement by transmitting a UE context setup response towards the CU, and the CU receives the UE context setup response from the target DU. Although one target DU is illustrated, there may be more than one target DU if there are multiple candidate target cells. The signals at 604 and 605 may be used for each target DU and for multiple candidate target cells. The description below will refer to candidate target cell(s) to indicate there may be one candidate target cell or multiple candidate target cells and, where appropriate, will refer to target DU(s) supporting the candidate target cell(s). If a target DU and the source DU are supported by different CUs, the CUS may communicate using an Xn interface. For convenience, only one CU is illustrated (a CU supporting the source DU), but it is intended for the disclosed technology to apply to multi-CU situations, as well.

For signal 605, and in accordance with aspects of the present disclosure, the target DU also transmits towards the CU information specifying a contention-free random access (CFRA) resource usable by the UE to communicate with the target DU for TA acquisition of a candidate target cell (e.g., a cell that is supported by the target DU) and for cell change to the candidate target cell. The CFRA resource may include, for example, a random access (RA) preamble and RA occasion that is allocated by the target DU and reserved for the UE to use for TA acquisition for the candidate target cell and for handover procedure for the candidate target cell (when non-RA-based handover is not possible).

For signal 606, the CU transmits a UE context modification request towards the source DU for modification of the UE context in the source DU, if needed, and for the provision of target cell information (e.g., target cell RS configuration, TCI states, etc.). The source DU receives the UE context modification request from the CU, modifies the UE context (if needed), and receives the target cell information. For signal 607, the source DU provides an acknowledgment by transmitting a UE context modification response towards the CU, and the CU receives the UE context modification response from the source DU.

For operation 608, the CU creates an RRC reconfiguration message, which includes a measurement configuration for an L1 cell change, a configuration of prepared candidate target cell(s) (e.g., cell(s) supported by the target DU), and a TA acquisition configuration and trigger for the candidate target cell(s). The TA acquisition configuration may specify the method for a UE to acquire TA. In accordance with aspects of the present disclosure, the method for the UE to acquire TA is an RA-based method, and the CFRA resource provided by the target DU (for signal 605) can be specified in the RRC reconfiguration message, to be set up in the UE and used by the UE to acquire TA for the candidate target cell and to perform handover procedure to the candidate target cell (when non-RA-based cell switch is not possible).

For signal 609, the CU transmits the RRC reconfiguration message towards the source DU using a downlink (DL) RRC message transfer, and the source DU receives the RRC reconfiguration message from the CU. As mentioned above, the RRC reconfiguration message specifies the CFRA resource usable by the UE for acquiring TA for a candidate target cell and for handover procedure for the candidate target cell. For signal 610, the source DU transmits the RRC reconfiguration message towards the UE to forward it to the UE, and the UE receives the RRC reconfiguration message from the source DU. The UE performs a reconfiguration based on the RRC reconfiguration message. For signal 611, the UE responds by transmitting a RRC reconfiguration complete message towards the source DU using an uplink (UL) RRC message transfer, and the source DU receives the RRC reconfiguration complete message from the UE. For signal 612, the source DU transmits the RRC reconfiguration complete message towards the CU to forward it to the CU, and the CU receives the RRC reconfiguration complete message from the source DU. In embodiments, the signals 609-612 may be described as part of a logical connection between the UE and the CU, such that the CU transmits the RRC message towards the UE, and the UE receives the RRC message from the CU.

In embodiments, the signals and operations 601-612 described above may be referred to as a preparation phase. After the preparation phase is an early synchronization phase for early TA acquisition.

In the early synchronization phase, for operation 613, the UE may perform downlink (DL) synchronization with candidate target cells. Persons skilled in the art will understand downlink synchronization. For operation 614, the source DU decides to trigger TA acquisition. For signal 615, the source DU transmits a PDCCH order towards the UE to trigger TA acquisition, and the UE receives the PDCCH order from the source DU.

In accordance with aspects of the present disclosure, for signals 616 and 617, the source DU informs the target DU (via the CU) that it triggered TA acquisition for the UE (e.g., UE identified as UE X). For signal 616, the source DU transmits a message towards the CU indicating that the source DU triggered TA acquisition for the UE, and the CU receives the message from the source DU. For signal 617, the CU relays the message to the target DU by transmitting the message towards the target DU, and the target DU receives the message.

For operation 618, the target DU, based on receiving the message from the source DU, anticipates that it will receive the CFRA resource (e.g., RA preamble and occasion) it allocated for signal 605, and the target DU deduces that this CFRA resource will be used by the UE for a TA acquisition for a candidate target cell (rather than for a handover procedure).

For signal 619, the UE initiates RA procedure with the target DU using the CFRA resource specified in the RRC reconfiguration message (signal 610) to acquire TA for a candidate target cell. For operation 620, based on the target DU deducing that the RA procedure is for TA acquisition, the target DU respond with a random access response (RAR) which provides TA information but has no grant of uplink resources for a RRC connect request message.

In embodiments, and as shown in FIG. 6A/6B, once the UE receives the PDCCH order, it may not immediately perform the RA procedure to the target DU for TA acquisition. Instead, the UE may start a timer to delay the RA procedure (signal 619) so that the source DU may have time inform the target DU (signals 616, 617) that TA acquisition has been triggered for the UE. In embodiments, the timer may be configured in the RRC reconfiguration message (signals and operations 608-610) or in the PDCCH order (signal 615).

In embodiments, as a variation (not shown), the source DU may transmit the PDCCH order (signal 615) after it transmits the message indicating TA acquisition has been triggered (signal 616). In such embodiments, the source DU may transmit the message for signal 616 and then wait for a specific time window (timer) before it transmits the PDCCH order for signal 615.

After the early synchronization phase is the execution phase and then the completion phase. In the execution phase, the UE, based on its configuration, provides periodic L1 measurement reports. Persons skilled in the art will understand L1 measurements. For signal 621, the UE provides L1 measurement reporting and periodically transmits L1 measurement reports towards the source DU, and the source DU receives the periodic L1 measurement reports from the UE. For operation 622, the source DU decides whether the UE should change serving cells. In embodiments, the source DU may decide that the UE should change serving cells if the L1 measurements fall below a threshold, for example. Once the source DU decides that the UE should be handed over to a cell (e.g., target cell supported by target DU), the source DU triggers the cell switch using a cell switch command (e.g., a MAC CE).

For signal 623, the cell switch command (e.g., MAC CE) is transmitted by the source DU towards the UE, and the UE receives the cell switch command (e.g., MAC CE) from the source DU. In response to the cell switch command, the UE applies the RRC configuration for the target cell indicated by the cell switch command, to switch to the target DU/target cell as the serving cell. In embodiments, the UE may perform random access (RA) procedure to the target cell, as shown for signal 624, if needed, to acquire TA for the target cell. However, in embodiments, the UE may be configured to not perform RA procedure to the target DU if it has already acquired the TA value of the target cell.

In accordance with aspects of the present disclosure, for signal 624, if random access procedure is needed, the UE may use the same allocated CFRA resource (e.g., random access preamble and occasion) as the CFRA resource described in connection with signal 619. In contrast to the message for signals 616 and 617, the source DU does not transmit any message to the target DU indicating the triggering of a handover. Accordingly, in the RA procedure for signal 624, the target DU may provide a random access response (RAR) that includes TA information as well as a grant of uplink (UL) resources for the UE to transmit a RRC connection request message.

The UE switches to the configuration of the target cell supported by the target DU. For signal 625, the UE transmits an RRC reconfiguration complete message towards the target DU using already configured uplink (UL) resources, and the target DU receives the RRC reconfiguration complete message from the UE. For signal 626, The target DU forwards the RRC reconfiguration complete message using UL RRC message transfer to transmit the RRC reconfiguration complete message towards the CU, and the CU receives the RRC reconfiguration complete message from the target DU. For signal 627, the CU transmits a UE context release command towards the source DU to release the UE context from the source DU, and the source DU receives the UE context release command from the CU. The source DU releases the UE context in response to the UE context release command. For signal 628, the source DU transmits a UE context release complete message towards the CU, and the CU receives the UE context release complete message from the source DU. The CU performs path switch to the target DU as the new DU supporting the serving cell.

Accordingly, for the example of FIG. 6A/6B, the source DU is relied upon to inform the target DU when the allocated CFRA resource will be used for TA acquisition, so that the target DU can deduce the purpose of a RA procedure by the UE. Thus, when the target DU receives the CFRA resource (e.g., RA preamble and occasion) but does not receive a corresponding message from the source DU, the target DU may deduce that the RA procedure is for a handover (rather than for TA acquisition).

Figure 6C:
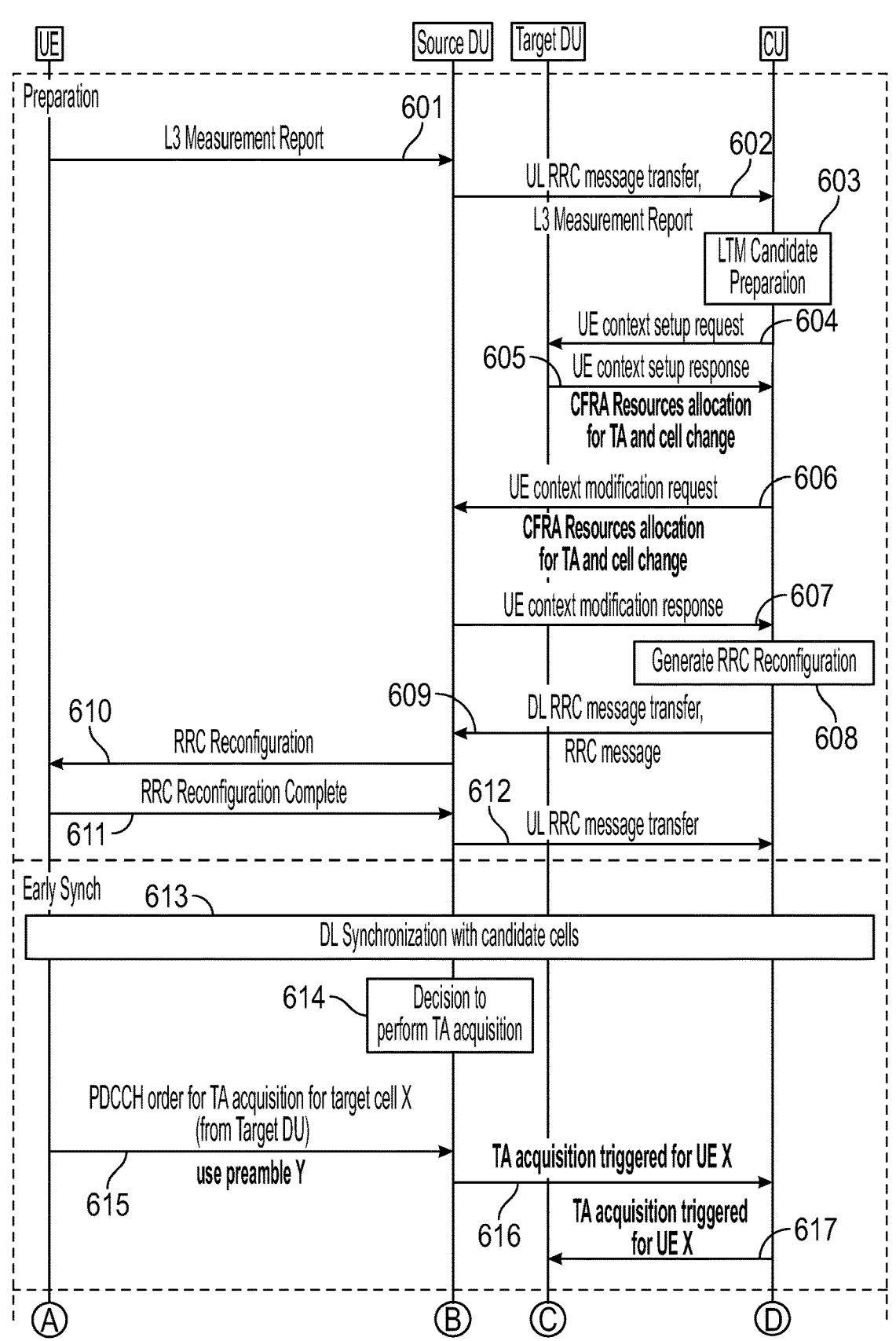
Figure 6D:
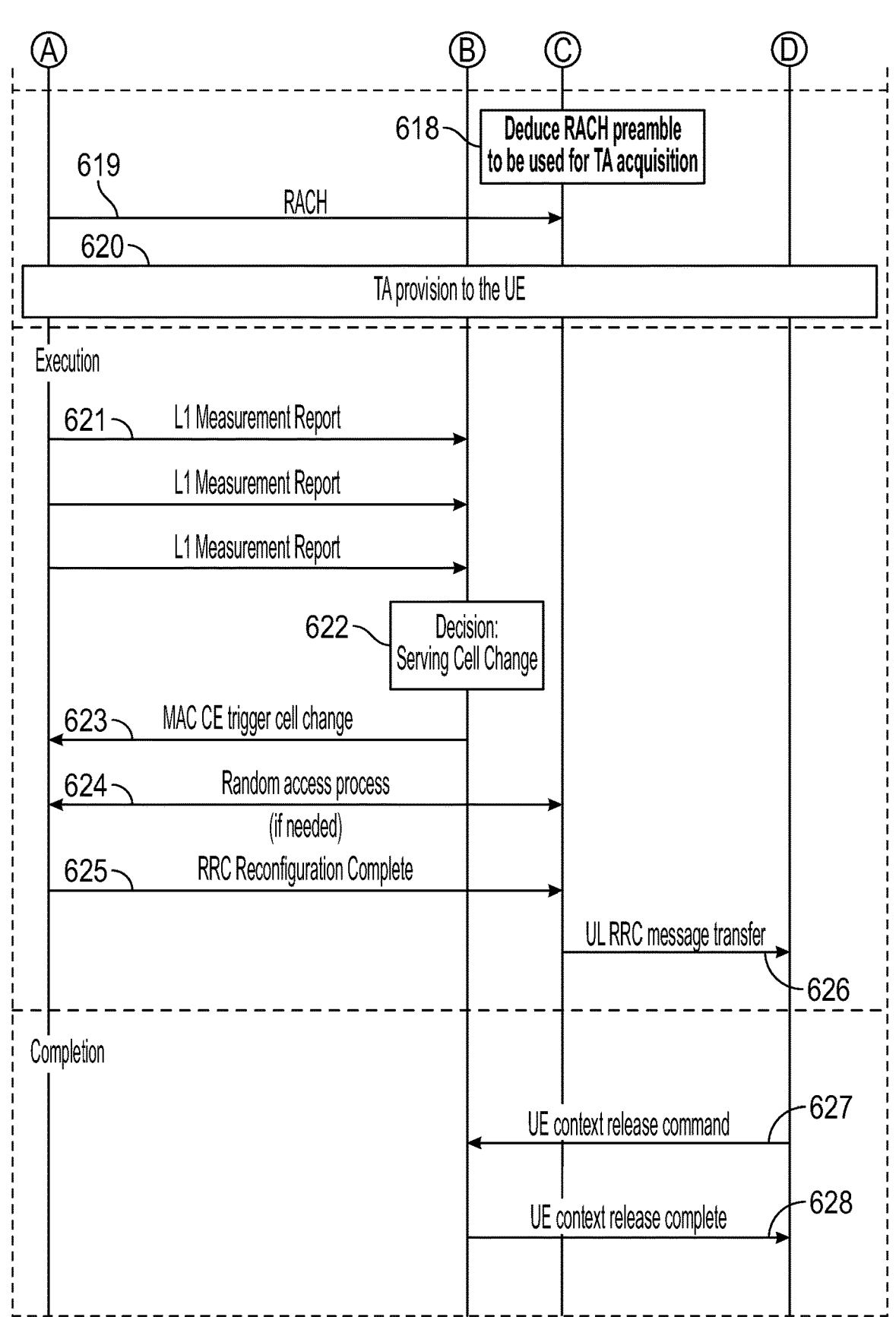

Referring now to FIG. 6C/6D, example signals and operations are shown in which the same CFRA resource is allocated for both TA acquisition and handover procedure, and the CFRA resource is specified to the UE in a PDCCH order.

In the preparation phase, signals and operations 601-612 in FIG. 6C/6D are the same as signals and operations 601-612 in FIG. 6A/6B, except that the RRC reconfiguration message does not specify the CFRA resource allocated by the target DU. Rather, the CU may inform the source DU of the CFRA resource (e.g., via signal 606).

In the early synchronization phase, signals and operations 613-620 in FIG. 6C/6D are the same as signals and operations 613-620 of FIG. 6A/6B, except that the PDCCH order (signal 615) specifies the CFRA resource to be used by the UE for TA acquisition for the candidate target cell. The CFRA resource may include an RA preamble (e.g., RA preamble Y) and may also include a RA occasion if more than one RA occasions are configured for a SSB (signal synchronization block).

The execution and completion phases of FIG. 6C/6D may be the same as those shown in FIG. 6A/6B.

Figure 6E:
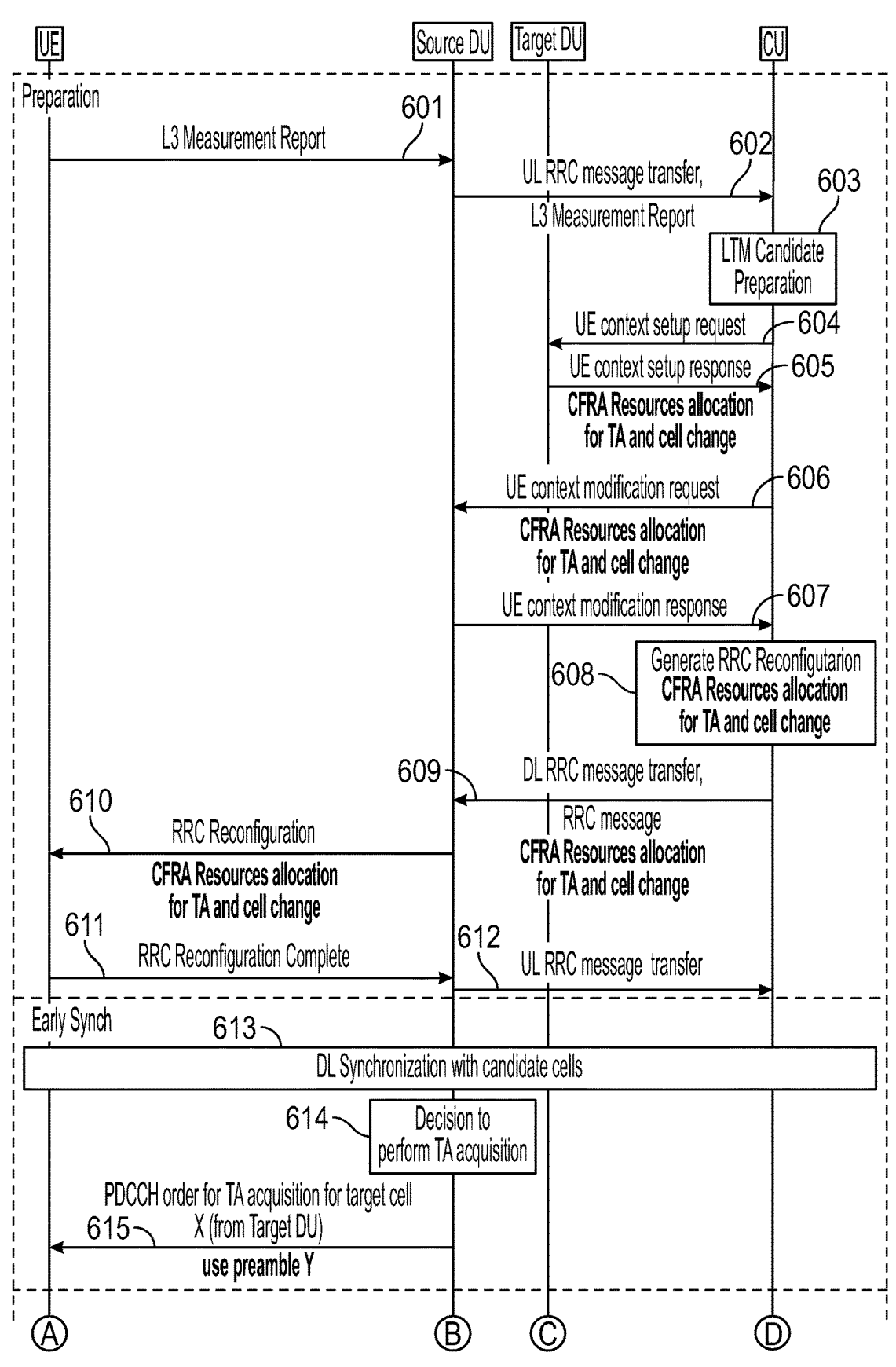
Figure 6F:
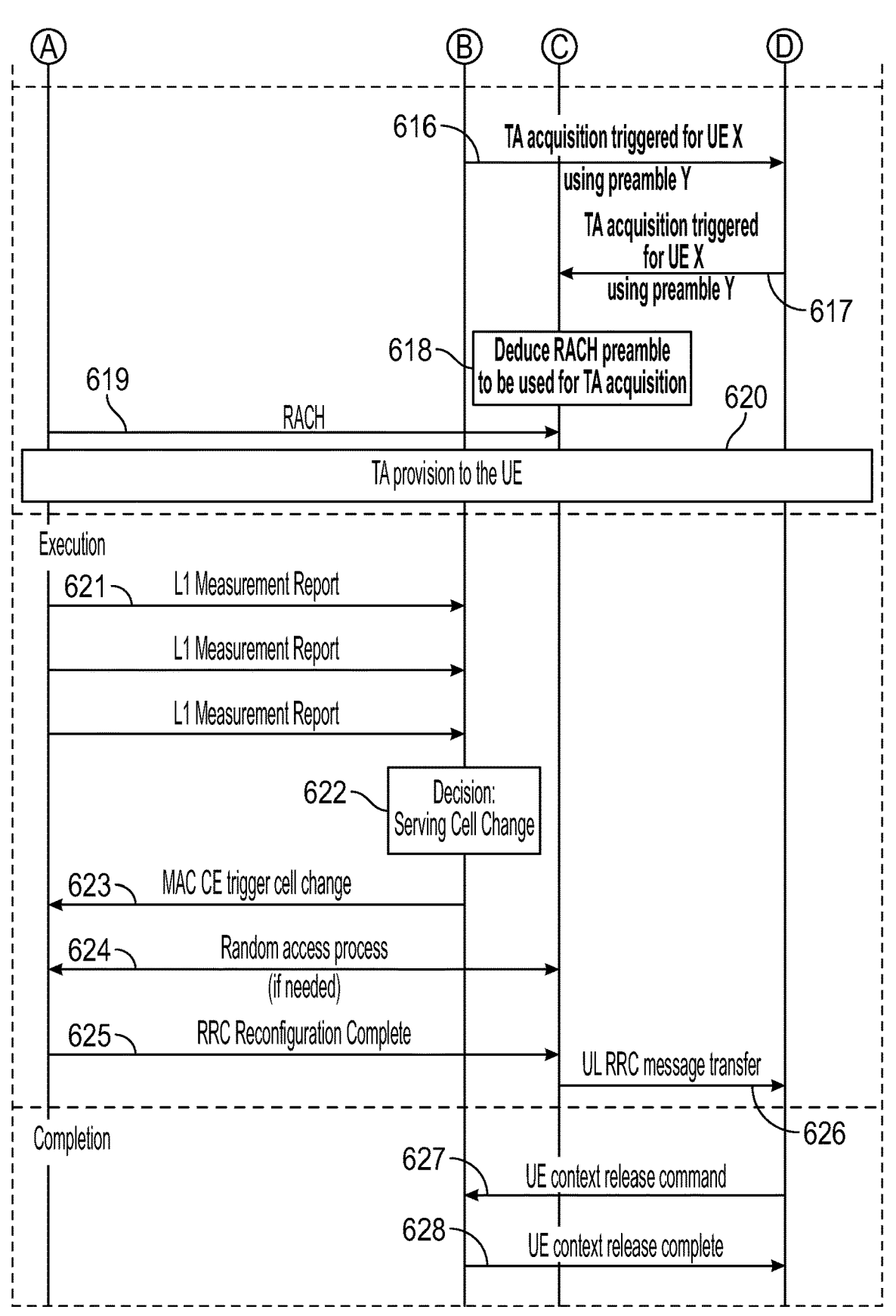

Referring now to FIG. 6E/6F, example signals and operations are shown in which the same CFRA resource is allocated for both TA acquisition and handover procedure, the CFRA resource is specified to both the UE and source DU via RRC message, and the source DU is relied upon to indicate when the CFRA resource is used for TA acquisition.

In the preparation phase, signals and operations 601-612 in FIG. 6E/6F are the same as signals and operations 601-612 in FIG. 6A/6B, except that the CU also informs the source DU of the CFRA resource (e.g., via signal 609).

In the early synchronization phase, signals and operations 613-620 in FIG. 6E/6F are the same as signals and operations 613-620 of FIG. 6A/6B, except that the PDCCH order (signal 615) specifies the CFRA resource (e.g., RA preamble Y) to be used by the UE for TA acquisition for the candidate target cell.

The execution and completion phases of FIG. 6E/6F may be the same as those shown in FIG. 6A/6B.

Accordingly, for FIGS. 6A-6F, the source DU is relied upon to inform the target DU when the allocated CFRA resource will be used for TA acquisition, so that the target DU can deduce the purpose of a RA procedure by the UE. Thus, when the target DU receives the CFRA resource (e.g., RA preamble and occasion) but does not receive a corresponding message from the source DU, the target DU may deduce that the RA procedure is for a handover (rather than for TA acquisition).

Referring now to FIGS. 7A-7F, such figures show an approach in which a target DU/candidate target cell allocates the same CFRA resource (e.g., RA preamble and occasion) for both TA acquisition and handover procedure, and the source DU is relied upon to inform the target DU (through one or more CU) when the UE uses the CFRA resource to perform handover procedure.

In FIG. 7A/7B, example signals and operations are shown in which the same CFRA resource is allocated for both TA acquisition and handover procedure, and the CFRA resource is specified to the UE in via an RRC message.

In the preparation phase, signals and operations 701-712 in FIG. 7A/7B are the same as signals and operations 601-612 in FIG. 6A/6B. In particular, the same CFRA resource is allocated for both TA acquisition and handover procedure, and the CFRA resource is specified to the UE in via an RRC message.

In the early synchronization phase, signals and operations 713-715 in FIG. 7A/7B are the same as the signals and operations 613-615 in FIG. 6A/6B. In particular, the source DU decides to trigger TA acquisition and transmits a PDCCH order towards the UE to trigger TA acquisition, and the UE receives the PDCCH order from the source DU. In accordance with aspects of the present disclosure, and in contrast to FIG. 6A/6B, the source DU in FIG. 7A/7B does not inform the target DU that it triggered TA acquisition for the UE. (Rather, as will be described below, the source DU will instead inform the target DU when it triggers a handover for the UE.)

For operation 716, the UE initiates RA procedure with the target DU using the CFRA resource allocated by the target DU (signal 705). For operation 717, the target DU, based on not receiving a corresponding message from the source DU, deduces that this CFRA resource is used by the UE for a TA acquisition for a candidate target cell (rather than for a handover procedure). For operation 718, based on the target DU deducing that the RA procedure is for TA acquisition, the target DU responds with a random access response (RAR) which provides TA information but has no grant of uplink resources for a RRC connect request message.

After the early synchronization phase is the execution phase and then the completion phase. In the execution phase, signals and operations 719-721 in FIG. 7A/7B are the same as signals and operations 621-623 in FIG. 6A/6B. In particular, the source DU decides that the UE should be handed over to a target cell (e.g., target cell supported by target DU), and the source DU triggers the cell switch using a cell switch command (e.g., a MAC CE).

In accordance with aspects of the present disclosure, for signals 722 and 723, the source DU informs the target DU (via the CU) that it triggered handover for the UE (e.g., UE identified as UE X). For signal 722, the source DU transmits a message towards the CU indicating that the source DU triggered handover procedure for the UE, and the CU receives the message from the source DU. For signal 723, the CU relays the message to the target DU by transmitting the message towards the target DU, and the target DU receives the message.

For operation 724, the target DU, based on receiving the message from the source DU, anticipates that the CFRA resource will be used by the UE for handover to a candidate target cell (rather than for TA acquisition). For signal 725, the UE performs RA procedure with the target DU using the same CFRA resource as that used for signal 716. Based on the target DU deducing that the RA procedure is for handover (operation 724), the target DU allocates uplink resources and responds with a random access response (RAR) which provides grant of uplink resources for the UE to transmit a RRC reconfiguration complete message. The UE applies the RRC configuration for the target cell indicated by the cell switch command, to switch to the target DU/target cell as the serving cell.

In embodiments, and as shown in FIG. 7A/7B, once the UE receives the MAC CE to trigger the cell change (signal 721), it may not immediately perform the RA procedure to the target DU (signal 725). Instead, the UE may start a timer to delay the RA procedure (signal 725) so that the source DU may have time inform the target DU (signals 722, 723) that handover has been triggered for the UE. In embodiments, the timer may be configured in the RRC reconfiguration message (signals and operations 708-710) or in the PDCCH order (signal 715).

In embodiments, as a variation (not shown), the source DU may transmit the MAC CE (signal 721) after it transmits the message indicating handover has been triggered (signal 722). In such embodiments, the source DU may transmit the message for signal 722 and then wait for a specific time window (timer) before it transmits the MAC CE for signal 721.

Signals and operations 726-729 in FIG. 7A/7B are the same as signals and systems 625-628 in FIG. 6A/6B.

Accordingly, for the example of FIG. 7A/7B, the source DU is relied upon to inform the target DU when the allocated CFRA resource will be used for handover procedure, so that the target DU can deduce the purpose of a RA procedure by the UE. Thus, when the target DU receives the CFRA resource (e.g., RA preamble and occasion) but does not receive a corresponding message from the source DU, the target DU may deduce that the RA procedure is for TA acquisition (rather than for handover procedure).

Figure 7C:
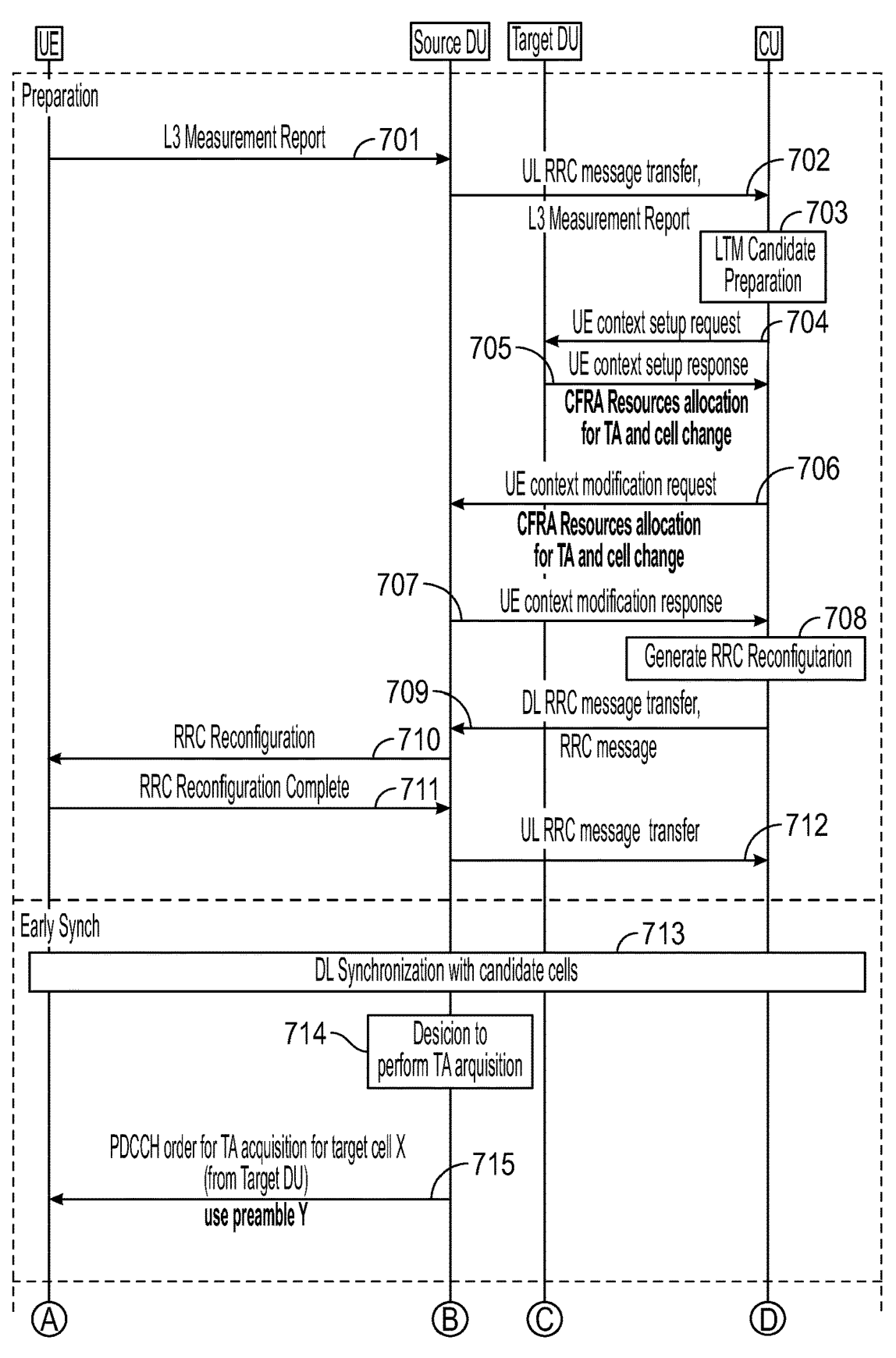
Figure 7D:
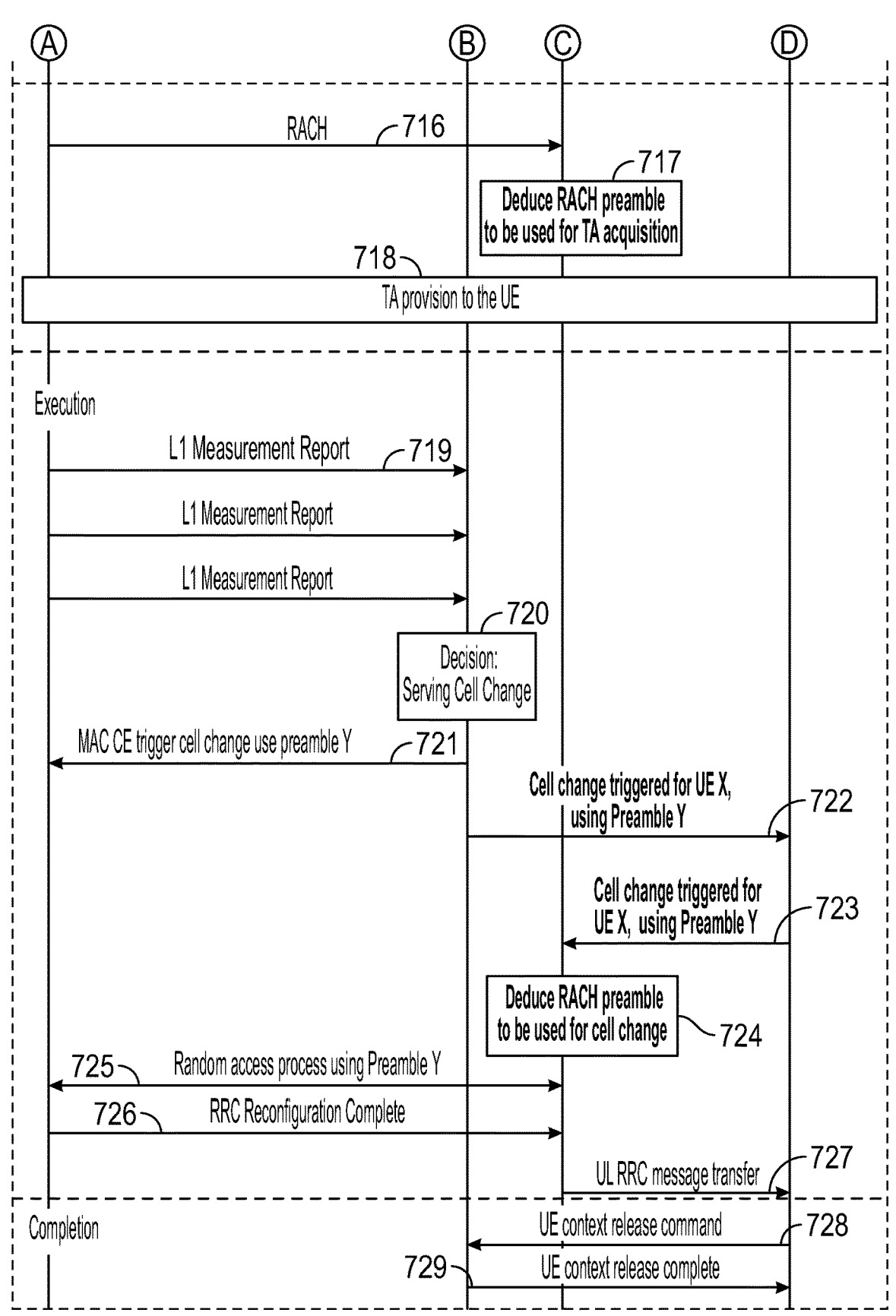

Referring now to FIG. 7C/7D, example signals and operations are shown in which the same CFRA resource is allocated for both TA acquisition and handover procedure, and the CFRA resource is specified to the UE in a PDCCH order and in a MAC CE.

In the preparation phase, signals and operations 701-712 in FIG. 7C/7D are the same as signals and operations 701-712 in FIG. 7A/7B, except that the RRC reconfiguration message does not specify the CFRA resource allocated by the target DU.

In the early synchronization phase, signals and operations 713-718 in FIG. 7C/7D are the same as signals and operations 713-718 of FIG. 7A/7B, except that the PDCCH order (signal 715) specifies the CFRA resource to be used by the UE for TA acquisition for the candidate target cell. The CFRA resource may include an RA preamble (e.g., RA preamble Y) and may also include a RA occasion if more than one RA occasions are configured for a SSB (signal synchronization block).

In the execution and completion phases, signals and operations 719-729 in FIG. 7C/7D are the same as signals and operations 719-729 of FIG. 7A/7B, except that the MAC CE (signal 721) specifies the CFRA resource to be used by the UE for handover to the candidate target cell. The CFRA resource may include an RA preamble (e.g., RA preamble Y) and may also include a RA occasion if more than one RA occasions are configured for a SSB (signal synchronization block).

Figure 7E:
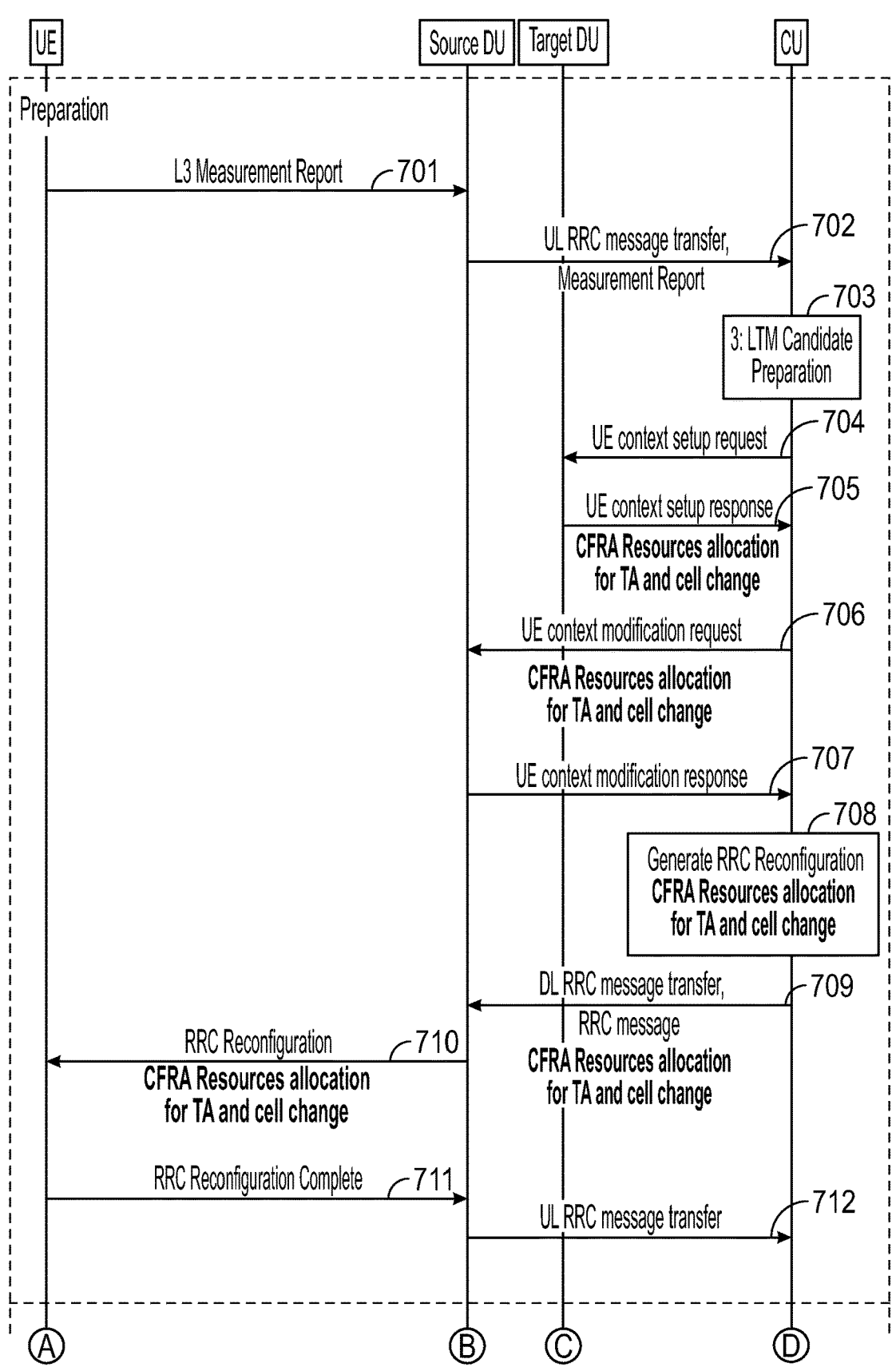
Figure 7F:
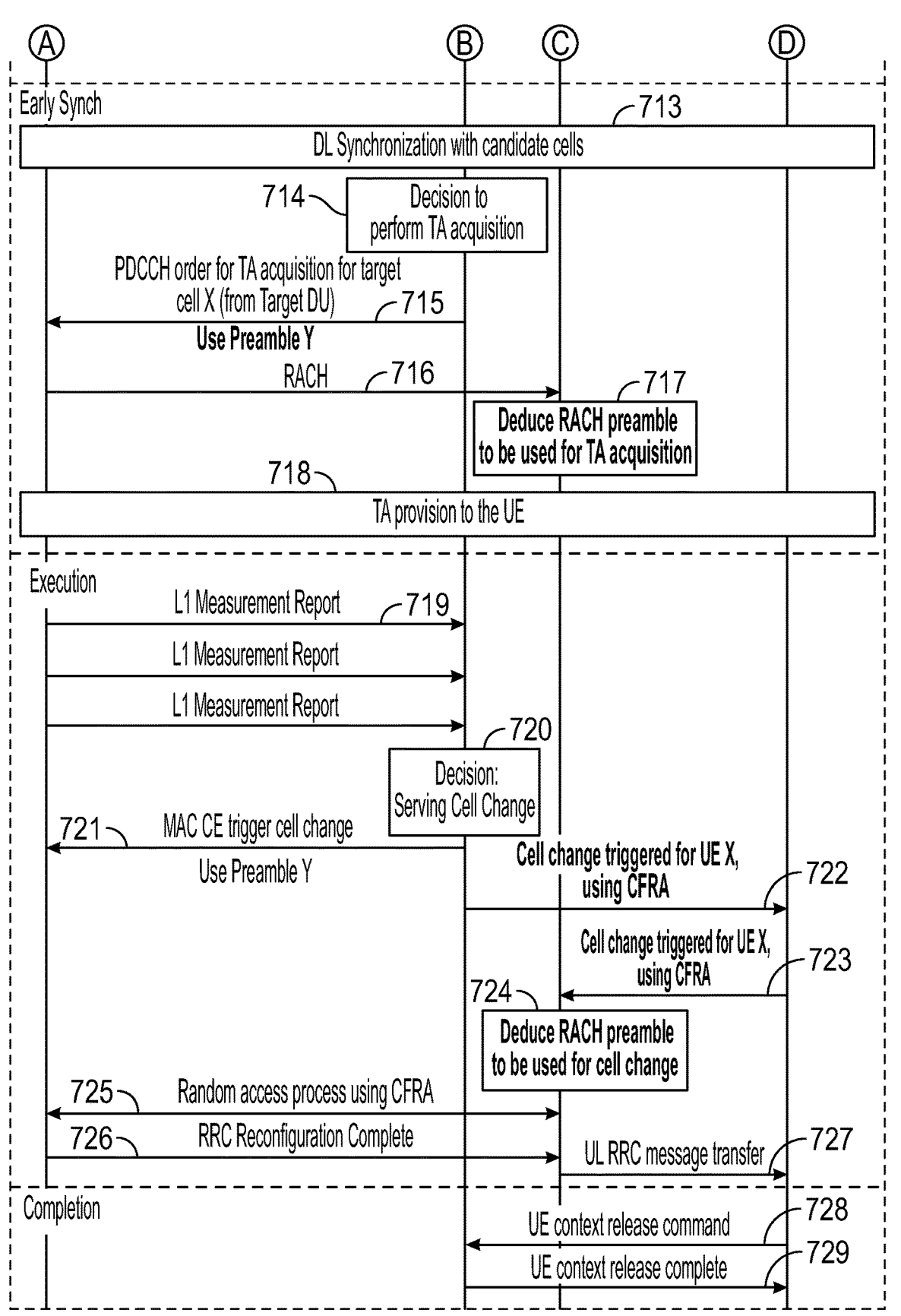

Referring now to FIG. 7E/7F, example signals and operations are shown in which the same CFRA resource is allocated for both TA acquisition and handover procedure, the CFRA resource is specified to both the UE and source DU via RRC message, and the source DU is relied upon to indicate when the CFRA resource is used for handover procedure.

In the preparation phase, signals and operations 701-712 in FIG. 7E/7F are the same as signals and operations 701-712 in FIG. 7A/7B.

In the early synchronization phase, signals and operations 713-718 in FIG. 7E/7F are the same as signals and operations 713-718 of FIG. 7A/7B, except that the PDCCH order (signal 715) specifies the CFRA resource to be used by the UE for TA acquisition for the candidate target cell. The CFRA resource may include an RA preamble (e.g., RA preamble Y) and may also include a RA occasion if more than one RA occasions are configured for a SSB (signal synchronization block).

In the execution and completion phases, the signals and operations following FIG. 7E/7F are the same as signals and operations 719-729 of FIG. 7A/7B, except that the MAC CE (signal 721) specifies the CFRA resource to be used by the UE for handover to the candidate target cell. The CFRA resource may include an RA preamble (e.g., RA preamble Y) and may also include a RA occasion if more than one RA occasions are configured for a SSB (signal synchronization block).

Accordingly, for the examples of FIG. 7A-7F, the source DU is relied upon to inform the target DU when the allocated CFRA resource will be used for handover procedure, so that the target DU can deduce the purpose of a RA procedure by the UE. Thus, when the target DU receives the CFRA resource (e.g., RA preamble and occasion) but does not receive a corresponding message from the source DU, the target DU may deduce that the RA procedure is for TA acquisition (rather than for handover procedure).

Referring now to FIGS. 8A-8F, such figures show an approach in which a target DU allocates different CFRA resources (e.g., two RA preambles and occasions)—a first CFRA resource for TA acquisition and a second CFRA resource for handover procedure.

In FIG. 8A/8B, example signals and operations are shown in which a target DU allocates different CFRA resources—a first CFRA resource for TA acquisition and a second CFRA resource for handover procedure, and the CFRA resources are specified to the UE in via an RRC message.

In the preparation phase, signals and operations 801-812 in FIG. 8A/8B are the same as signals and operations 601-612 in FIG. 6A/6B, except that the target DU allocates different CFRA resources (e.g., two RA preambles and occasions)—a first CFRA resource for TA acquisition and a second CFRA resource for handover procedure, and the different CFRA resources are specified in the RRC reconfiguration message.

In the early synchronization phase, signals and operations 813-815 in FIG. 8A/8B are the same as signals and operations 613-615 in FIG. 6A/6B. In particular, the source DU decides to trigger TA acquisition and transmits a PDCCH order towards the UE to trigger TA acquisition, and the UE receives the PDCCH order from the source DU.

In accordance with aspects of the present disclosure, for signal 816, the UE initiates RA procedure with the target DU using the first CFRA resource specified in the RRC reconfiguration message (signal 810) to acquire TA for a candidate target cell. For operation 817, based on the target DU associating the first CFRA resource with TA acquisition, the target DU respond with a random access response (RAR) which provides TA information but has no grant of uplink resources for a RRC connection request message.

In the execution and completion phases, signals and systems 818-820 in FIG. 8A/8B are the same signals and systems 618-620 in FIG. 6A/6B.

In accordance with aspects of the present disclosure, for signal 821, the UE initiates RA procedure with the target DU, if needed, using the second CFRA resource specified in the RRC reconfiguration message (signal 810) for handover procedure to a candidate target cell. Based on the target DU associating the second CFRA resource with handover operation, the target DU provides TA information and allocates uplink resources for the UE to transmit a RRC reconfiguration complete message, and the target DU responds with a random access response (RAR) which specifies the grant of uplink resources.

Signals and systems 822-825 in FIG. 8A/8B are the same as signals and operations 625-628 in FIG. 6A/6B.

Accordingly, for the examples of FIG. 8A/8B, the target DU allocates different CFRA resources for TA acquisition and for handover procedure. Based on receiving a CFRA resource associated TA acquisition or a CFRA resource associated with handover procedure, the target DU can determine the purpose of the RA procedure by the UE and provide an appropriate random access response (RAR).

Figure 8C:
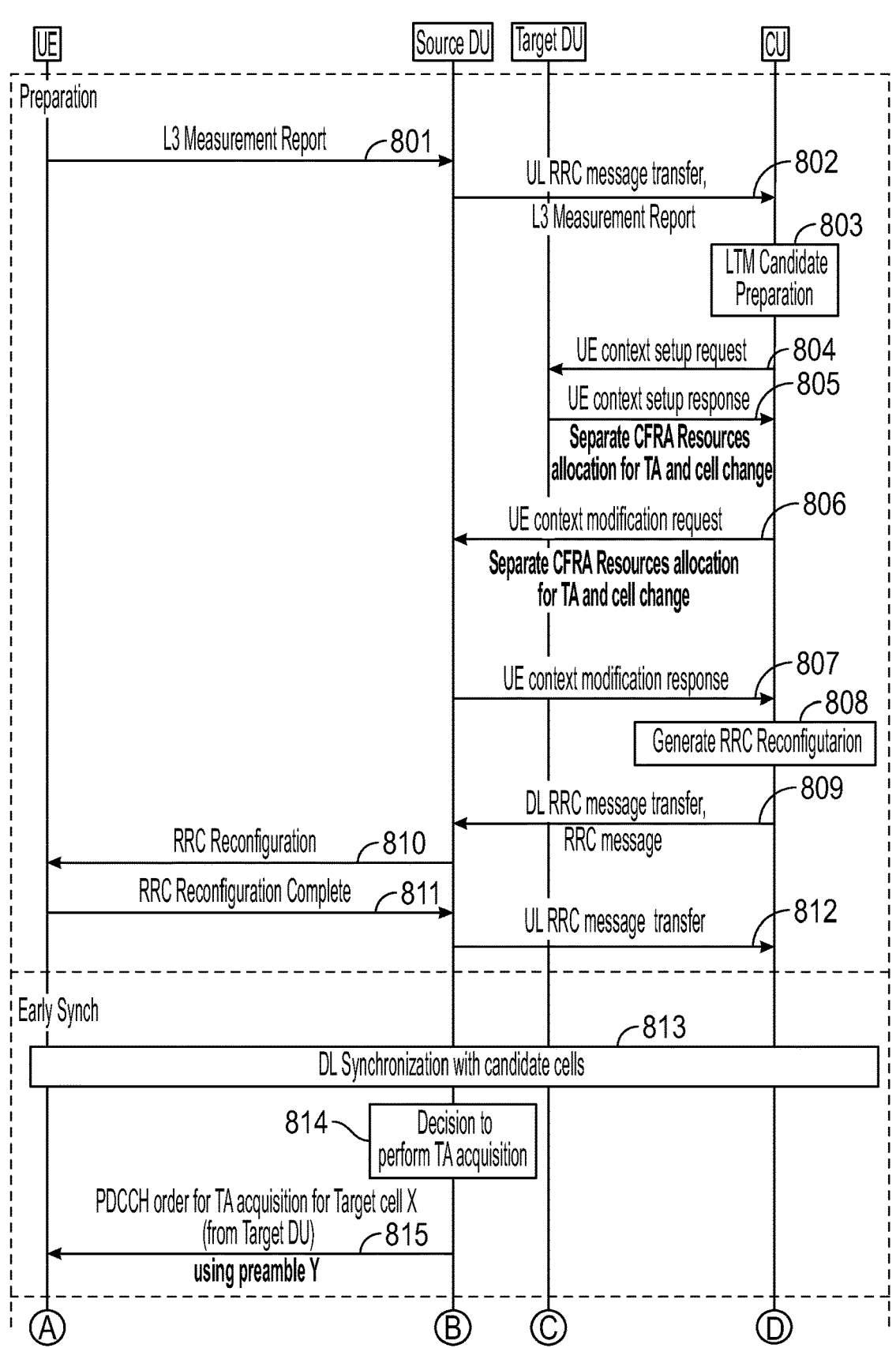
Figure 8E:
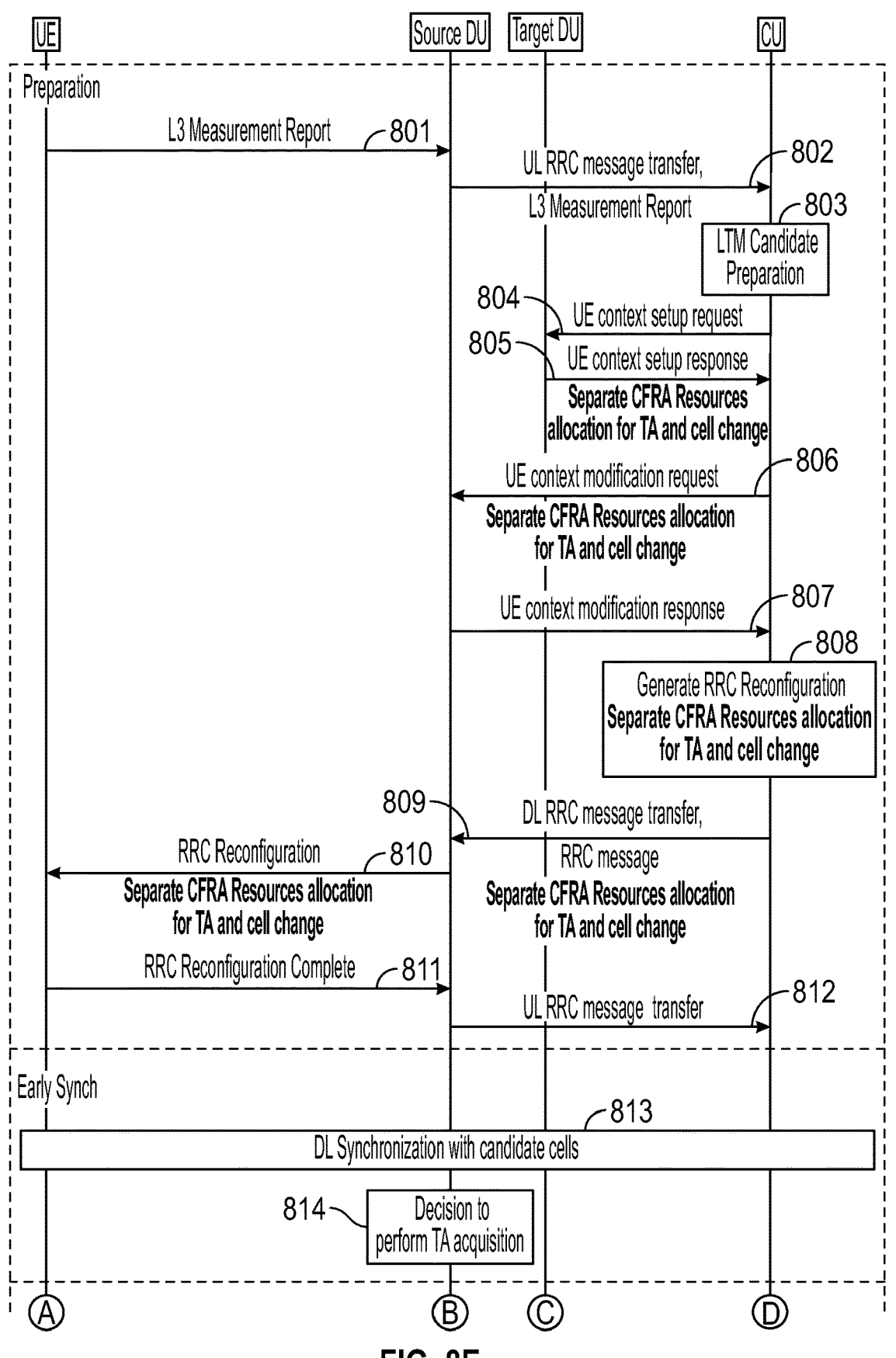
Figure 8F:
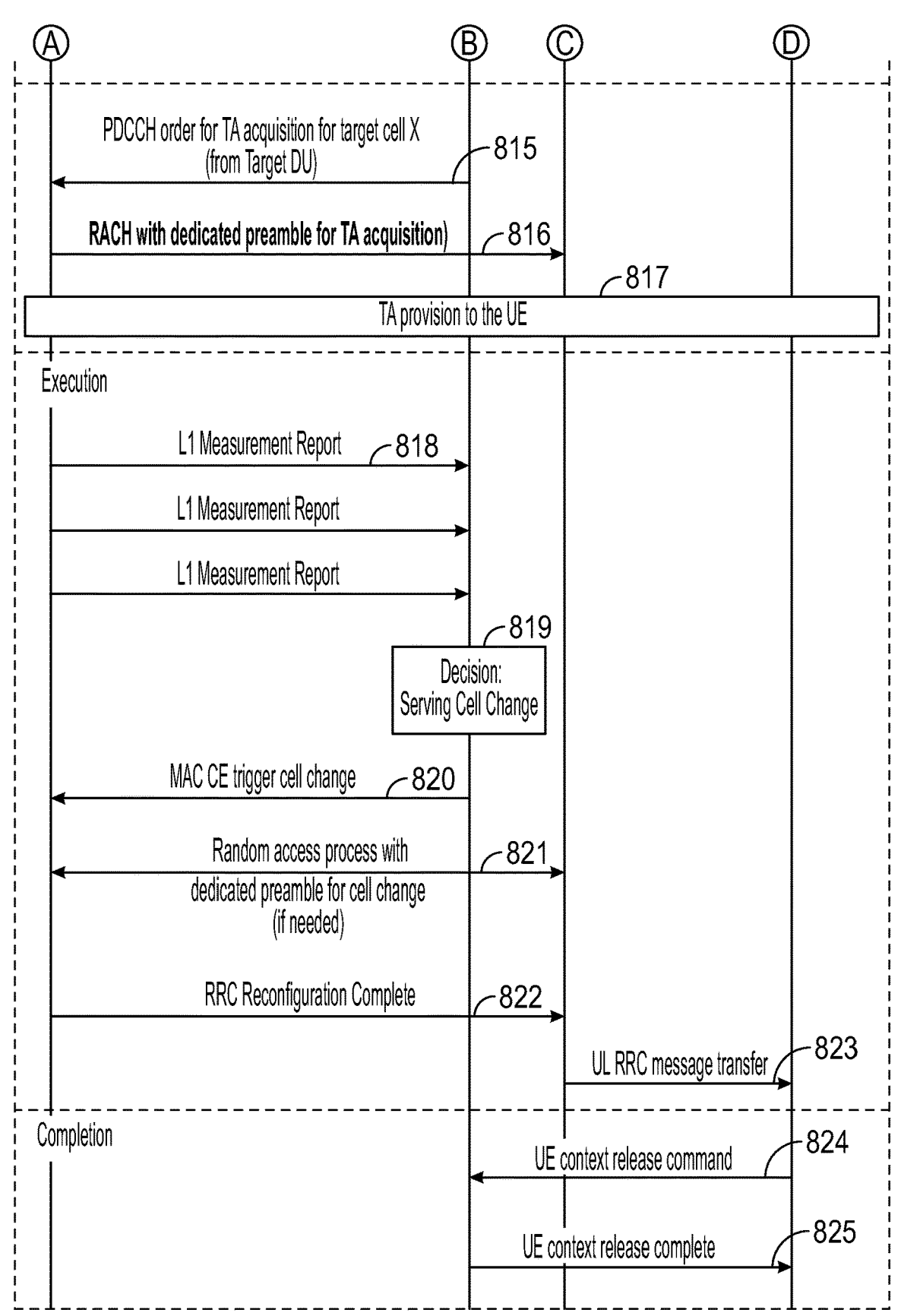

Referring now to FIG. 8C/8D, example signals and operations are shown in which a target DU allocates different CFRA resources—a first CFRA resource for TA acquisition and a second CFRA resource for handover procedure, the first CFRA resource is specified to the UE in via PDCCH order (for TA acquisition), and the second CFRA resource is specified to the UE via MAC CE (for RA-based cell switch).

In the preparation phase, signals and operations 801-812 in FIG. 8C/8D are the same as signals and operations 801-812 in FIG. 8A/8B, except that the RRC reconfiguration message does not specify the CFRA resource allocated by the target DU.

In the early synchronization phase, signals and operations 813-817 in FIG. 8C/8D are the same as signals and operations 813-817 of FIG. 8A/8B, except that the PDCCH order (signal 815) specifies the first CFRA resource to be used by the UE for TA acquisition for the candidate target cell. The first CFRA resource may include an RA preamble (e.g., RA preamble Y) and may also include a RA occasion if more than one RA occasions are configured for a SSB (signal synchronization block).

In the execution and completion phases, signals and operations following FIG. 8C/8D are the same as signals and operations 818-825 of FIG. 8A/8B, except that the MAC CE (signal 820) specifies the second CFRA resource to be used by the UE for handover to the candidate target cell. The second CFRA resource may include an RA preamble and may also include a RA occasion if more than one RA occasions are configured for a SSB (signal synchronization block).

Referring now to FIG. 8C/8D, example signals and operations are shown in which a target DU allocates different CFRA resources—a first CFRA resource for TA acquisition and a second CFRA resource for handover procedure, the CFRA resources are specified to the UE and the source DU via RRC message, and the source DU indicates the specific usage.

In the preparation phase, signals and operations 801-812 in FIG. 8C/8D are the same as signals and operations 801-812 in FIG. 8A/8B.

In the early synchronization phase, signals and operations 813-817 in FIG. 8C/8D are the same as signals and operations 813-817 of FIG. 8A/8B, except that the PDCCH order (signal 815) specifies the first CFRA resource to be used by the UE for TA acquisition for the candidate target cell. The first CFRA resource may include an RA preamble (e.g., RA preamble Y) and may also include a RA occasion if more than one RA occasions are configured for a SSB (signal synchronization block).

In the execution and completion phases, signals and operations following FIG. 8C/8D are the same as signals and operations 818-825 of FIG. 8A/8B, except that the MAC CE (signal 820) specifies the second CFRA resource to be used by the UE for handover to the candidate target cell. The second CFRA resource may include an RA preamble and may also include a RA occasion if more than one RA occasions are configured for a SSB (signal synchronization block).

Accordingly, for the examples of FIG. 8A-8F, the target DU allocates different CFRA resources for TA acquisition and for handover procedure. Based on receiving a CFRA resource associated TA acquisition or a CFRA resource associated with handover procedure, the target DU can determine the purpose of the RA procedure by the UE and provide an appropriate random access response (RAR).

In examples of FIG. 6A/6B, FIG. 6C/6D, FIG. 7A/7B, FIG. 7C/7D, FIG. 8A/8B, and FIG. 8C/8D, the CFRA resource(s) for TA acquisition may be implemented as part of the random access procedure framework. In embodiments, a new indicator is added in the FeatureCombination information element (IE). Persons skilled in the art will recognize the FeatureCombination IE. In embodiments, the new indicator may be named "early_TA_acquisition." In embodiments, the new indicator would indicate the feature combination preambles to dedicate and allocate as CFRA resource(s) for TA acquisition. As described above, CFRA resources may include random access preamble and random access occasion for a signal synchronization block (SSB). When a UE is triggered to acquire TA, the UE would then know to use the dedicated CFRA resources for the TA acquisition. In embodiments, no feature priority needs to be indicated, as the CFRA resource(s) are indicated for this use-case and the UE should understand this as high priority resources that are only to be used for TA acquisition. In embodiments, in case a network uses a combination of features with the CFRA resources for TA acquisition, then the network can indicate a feature priority or a feature combination priority with the early_TA_acquisition command.

Referring now to FIG. 9, there is shown an example flow diagram of an operation of a user equipment apparatus. At block 910, the operation involves establishing a connection towards a source network node via a source cell supported by the source network node, where the source network node supports at least one of distributed unit (DU) functionality or a layer 2 protocol of a radio access network. At block 920, the operation involves receiving, from the radio access network, a configuration related to Layer 1/Layer 2 triggered mobility (LTM), where the configuration indicates at least one candidate cell the user equipment apparatus may connect to. At block 930, the operation involves receiving, from the radio access network, a contention-free random access (CFRA) resource usable for either of: a potential timing advance (TA) acquisition for at least one candidate target cell or a potential connection to a specific candidate target cell. At block 940, the operation involves using the CFRA resource for either of: acquiring TA for the specific candidate target cell, in response to receiving a respective TA acquisition request from the radio access network, or connecting to the specific candidate target cell, in response to receiving a respective trigger from the radio access network. The operation of FIG. 9 is merely an example, and variations are contemplated to be within the scope of the present disclosure.

Further embodiments of the present disclosure include the following examples.

Example 1.1. A user equipment apparatus comprising:
at least one processor; and
at least one memory storing instructions which, when executed by the at least one processor, cause the user equipment apparatus at least to:

establish a connection towards a source network node via a source cell supported by the source network node, wherein the source network node supports at least one of distributed unit (DU) functionality or a layer 2 protocol of a radio access network;
receive, from the radio access network, a configuration related to Layer 1/Layer 2 triggered mobility (LTM), the configuration indicating at least one candidate cell the user equipment apparatus may connect to:
receive, from the radio access network, a first contention-free random access (CFRA) resource usable for a potential timing advance (TA) acquisition for at least one candidate target cell, and a second CFRA resource usable for a potential connection to a specific candidate target cell; and
use at least one of: the first CFRA resource for acquiring TA for the specific candidate target cell, in response to receiving a respective TA acquisition request from the radio access network, or the second CFRA resource for connecting to the specific candidate target cell, in response to receiving a respective trigger from the radio access network.

Example 1.2. The user equipment apparatus of Example 1.1, wherein
the first CFRA resource and the second CFRA resource are received within one RRC message received from a control network node, wherein the control network node supports at least one of central unit (CU) functionality or a layer 3 protocol of the radio access network.

Example 1.3. The user equipment apparatus of Example 1.1, wherein
the TA acquisition request and the first CFRA resource are received within a physical downlink control channel (PDCCH) order message received from the source network node, wherein the PDCCH order specifies at least one of: a dedicate RA preamble, a specific RA occasion, or a specific signal synchronization block (SSB) to be used for the TA acquisition.

Example 1.4. The user equipment apparatus of Example 1.1, wherein the trigger and the second CFRA resource are received within a media access control-control element (MAC-CE) message received from the source network node, wherein the MAC-CE message specifies at least one of: a dedicate RA preamble, a specific RA occasion, or a specific signal synchronization block (SSB) to be used for connecting to the specific target candidate cell.

Example 1.5. The user equipment apparatus of Example 1.1, wherein the TA acquisition request and the first CFRA resource are received within a physical downlink control channel (PDCCH) order message received from the source network node, wherein the PDCCH order specifies the first CFRA resource as at least one of: a dedicate RA preamble, a specific RA occasion, or a specific signal synchronization block (SSB) to be used for the TA acquisition,
wherein the trigger and the second CFRA resource are received within a media access control-control element (MAC-CE) message received from the source network node, wherein the MAC-CE message specifies the second CFRA resource as at least one of: a dedicate RA preamble, a specific RA occasion, or a specific signal synchronization block (SSB) to be used for connecting to the specific target candidate cell, and
wherein at least one of the first CFRA resource specified in the PDCCH order is different from at least one of the second CFRA resource specified in the MAC-CE message.

Example 1.6. The user equipment apparatus of any of Example 1.1 to 1.5, wherein the instructions, when executed by the at least one processor, further cause the user equipment apparatus at least to:

in case the first CFRA resource is used for acquiring TA for the specific candidate target cell, receive a random access response (RAR) comprising TA information but having no uplink grant for a RRC reconfiguration complete message.

Example 1.7. The user equipment apparatus of any of Example 1.1 to 1.6, wherein the instructions, when executed by the at least one processor, further cause the user equipment apparatus at least to:

in case the second CFRA resource is used for connecting to the specific candidate target cell, receiving a random access response (RAR) comprising TA information and an uplink grant for a RRC reconfiguration complete message.

Example 1.8. The user equipment apparatus of any of Example 1.1 to 1.7, wherein the first CFRA resource is indicated in a feature specific random access channel (RACH) configuration.

Example 1.9. The user equipment apparatus of Example 1.8, wherein the feature specific RACH configuration comprises an early_TA_acquisition feature that is indicated as true.

Example 1.10. A processor-implemented method in a user equipment apparatus, the processor-implemented method comprising:

establishing a connection towards a source network node via a source cell supported by the source network node, wherein the source network node supports at least one of distributed unit (DU) functionality or a layer 2 protocol of a radio access network;

receiving, from the radio access network, a configuration related to Layer 1/Layer 2 triggered mobility (LTM), the configuration indicating at least one candidate cell the user equipment apparatus may connect to:

receiving from the radio access network, a first contention-free random access (CFRA) resource usable for a potential timing advance (TA) acquisition for at least one candidate target cell, and a second CFRA resource usable for a potential connection to a specific candidate target cell; and using at least one of: the first CFRA resource for acquiring TA for the specific candidate target cell, in response to receiving a respective acquisition request from the radio access network, or the second CFRA resource for connecting to the candidate target cell, in response to receiving a respective trigger from the radio access network.

Example 1.11. The processor-implemented method of Example 1.10, wherein the first CFRA resource and the second CFRA resource are received within one RRC message received from a control network node, wherein the control network node supports at least one of central unit (CU) functionality or a layer 3 protocol of the radio access network.

Example 1.12. The processor-implemented method of Example 1.10, wherein the TA acquisition request and the first CFRA resource are received within a physical downlink control channel (PDCCH) order message received from the source network node, wherein the PDCCH order specifies at least one of: a dedicate RA preamble, a specific RA occasion, or a specific signal synchronization block (SSB) to be used for the TA acquisition.

Example 1.13. The processor-implemented method of Example 1.10, wherein the trigger and the second CFRA resource are received within a media access control-control element (MAC-CE) message received from the source network node, wherein the MAC-CE message specifies at least one of: a dedicate RA preamble, a specific RA occasion, or a specific signal synchronization block (SSB) to be used for connecting to the specific target candidate cell.

Example 1.14. The processor-implemented method of Example 1.10, wherein the TA acquisition request and the first CFRA resource are received within a physical downlink control channel (PDCCH) order message received from the source network node, wherein the PDCCH order specifies the first CFRA resource as at least one of: a dedicate RA preamble, a specific RA occasion, or a specific signal synchronization block (SSB) to be used for the TA acquisition, wherein the trigger and the second CFRA resource are received within a media access control-control element (MAC-CE) message received from the source network node, wherein the MAC-CE message specifies the second CFRA resource as at least one of: a dedicate RA preamble, a specific RA occasion, or a specific signal synchronization block (SSB) to be used for connecting to the specific target candidate cell, and wherein at least one of the first CFRA resource specified in the PDCCH order is different from at least one of the second CFRA resource specified in the MAC CE message.

Example 1.15. The processor-implemented method of any of Example 1.10 to 1.14, wherein the instructions, when executed by the at least one processor, further cause the user equipment apparatus at least to:

in case the first CFRA resource is used for acquiring TA for the specific candidate target cell, receiving a random access response (RAR) comprising TA information but having no uplink grant for a RRC reconfiguration complete message.

Example 1.16. The processor-implemented method of any of Example 1.10 to 1.15, wherein the instructions, when executed by the at least one processor, further cause the user equipment apparatus at least to:

in case the second CFRA resource is used for connecting to the specific candidate target cell, receiving a random access response (RAR) comprising TA information and an uplink grant for a RRC reconfiguration complete message.

Example 1.17. The processor-implemented method of any of Example 1.10 to 1.16, wherein the first CFRA resource is indicated in a feature specific random access channel (RACH) configuration.

Example 1.18. The processor-implemented method of Example 1.17, wherein the feature specific RACH configuration comprises an early_TA_acquisition feature that is indicated as true.

Example 1.19. A network node supporting at least one of distributed unit (DU) functionality or a layer 2 protocol of a radio access network and supporting a candidate target cell with which a user equipment apparatus (UE) may connect, the network node comprising:

at least one processor; and at least one memory storing instructions which, when executed by the at least one processor, cause the network node at least to:

allocate a first contention-free random access (CFRA) resource usable for a potential timing advance (TA)

acquisition for the candidate target cell by the UE and a second CFRA resource usable for a potential connection to the candidate target cell by the UE; and transmit, towards a control network node supporting at least one of central unit-control plane (CU-CP) functionality or a layer 3 protocol of a radio access network, information specifying the first CFRA resource and the second CFRA resource.

Example 1.20. The network node of Example 1.19, wherein the instructions, when executed by the at least one processor, further cause the network node at least to:

receive, from the UE, a random access (RA) preamble corresponding to the allocated first CFRA resource; and in response to receiving the RA preamble, transmit a random access response comprising TA information but having no uplink grant for a RRC reconfiguration complete message.

Example 1.21. The network node of Example 1.19, wherein the instructions, when executed by the at least one processor, further cause the network node at least to:

receive, from the UE, a random access (RA) preamble corresponding to the allocated second CFRA resource; and in response to receiving the RA preamble, transmit a random access response comprising TA information and an uplink grant for a RRC reconfiguration complete message.

Example 1.22. A processor-implemented method comprising:

providing, for a candidate target cell, at least one of distributed unit (DU) functionality or a layer 2 protocol of a radio access network;

allocating a first contention-free random access (CFRA) resource usable for a potential timing advance (TA) acquisition for the candidate target cell by the UE and a second CFRA resource usable for a potential connection to the candidate target cell by the UE; and transmitting, towards a control network node supporting at least one of central unit-control plane (CU-CP) functionality or a layer 3 protocol of a radio access network, information specifying the first CFRA resource and the second CFRA resource.

Example 1.23. The processor-implemented method of Example 1.22, wherein the UE is served by a serving cell that is supported by a source network node which supports at least one of distributed unit (DU) functionality or a layer 2 protocol of a radio access network, the processor implemented method further comprising:

receiving, from the UE, a random access (RA) preamble corresponding to the allocated first CFRA resource; and in response to receiving the RA preamble, transmitting a random access response comprising TA information but having no uplink grant for a RRC reconfiguration complete message.

Example 1.24. The processor-implemented method of Example 1.22, wherein the UE is served by a serving cell that is supported by a source network node which supports at least one of distributed unit (DU) functionality or a layer 2 protocol of a radio access network, the processor implemented method further comprising:

receiving, from the UE, a random access (RA) preamble corresponding to the allocated second CFRA resource; and in response to receiving the RA preamble, transmitting a random access response comprising TA information and an uplink grant for a RRC reconfiguration complete message.

Example 2.1. A network node supporting at least one of distributed unit (DU) functionality or a layer 2 protocol of a radio access network and supporting a serving cell, the network node comprising:

at least one processor; and at least one memory storing instructions which, when executed by the at least one processor, cause the network node at least to:

establish a connection with a user equipment apparatus (UE) via the serving cell; and transmit, towards the UE, at least one of:

a radio resource control (RRC) reconfiguration message using downlink RRC message transfer, the RRC reconfiguration message specifying at a contention-free random access (CFRA) resource usable either for: a potential timing advance (TA) acquisition for at least one candidate target cell or a potential connection to a candidate target cell, a physical downlink control channel (PDCCH) order specifying the CFRA resource, or a media access control-control element (MAC-CE) specifying the CFRA resource.

Example 2.2. The network node of Example 2.1, wherein the candidate target cell is served by a target network node which supports at least one of distributed unit (DU) functionality or a layer 2 protocol of a radio access network, wherein the instructions, when executed by the at least one processor, further cause the network node at least to:

trigger the UE to perform the TA acquisition for a specific candidate target cell, and transmit, towards the target network node, a message indicating the UE was triggered to perform the TA acquisition for the specific candidate target cell.

Example 2.3. The network node of Example 2.2, wherein the message, indicating the UE was triggered, is transmitted towards the target network node before triggering the UE to perform the TA acquisition.

Example 2.4. The network node of Example 2.1, wherein the candidate target cell is served by a target network node which supports at least one of distributed unit (DU) functionality or a layer 2 protocol of a radio access network, wherein the instructions, when executed by the at least one processor, further cause the network node at least to:

trigger the UE to connect to a specific candidate target cell, and transmit, towards the target network node, a message indicating the UE was triggered to connect to the specific candidate target cell.

Example 2.5. The network node of Example 2.4, wherein the message, indicating the UE was triggered, is transmitted towards the target network node before triggering the UE to connect to the specific candidate target cell.

Example 2.6. A processor-implemented method comprising:

providing, for a serving cell, at least one of distributed unit (DU) functionality or a layer 2 protocol of a radio access network;

establishing a connection with a user equipment apparatus (UE) via the serving cell; and transmitting, towards the UE, at least one of:

a radio resource control (RRC) reconfiguration message using downlink RRC message transfer, the RRC reconfiguration message specifying at a contention-free random access (CFRA) resource usable either for: a potential timing advance (TA) acquisition for at least one candidate target cell or a potential connection to a candidate target cell, a physical downlink control channel (PDCCH) order specifying the CFRA resource, or a media access control-control element (MAC-CE) specifying the CFRA resource.

Example 2.7. The processor-implemented method of Example 2.6, wherein the candidate target cell is served by a target network node which supports at least one of distributed unit (DU) functionality or a layer 2 protocol of a radio access network, the processor-implemented method further comprising:

triggering the UE to perform the TA acquisition for a specific candidate target cell, and transmitting, towards the target network node, a message indicating the UE was triggered to perform the TA acquisition for the specific candidate target cell.

Example 2.8. The processor-implemented method of Example 2.7, wherein the message, indicating the UE was triggered, is transmitted towards the target network node before triggering the UE to perform the TA acquisition.

Example 2.9. The processor-implemented method of Example 2.6, wherein the candidate target cell is served by a target network node which supports at least one of distributed unit (DU) functionality or a layer 2 protocol of a radio access network, the processor-implemented method further comprising:

triggering the UE to connect to the specific candidate target cell, and transmitting, towards the target network node, a message indicating the UE was triggered to connect to the specific candidate target cell.

Example 2.10. The processor-implemented method of Example 2.9, wherein the message, indicating the UE was triggered, is transmitted towards the target network node before triggering the UE to connect to the specific candidate target cell.

Example 2.11. A network node supporting at least one of distributed unit (DU) functionality or a layer 2 protocol of a radio access network and supporting a serving cell, the network node comprising:

at least one processor; and at least one memory storing instructions which, when executed by the at least one processor, cause the network node at least to:

establish a connection with a user equipment apparatus (UE) via the serving cell; and transmit, towards the UE, at least one of:

a radio resource control (RRC) reconfiguration message using downlink RRC message transfer, the RRC reconfiguration message specifying at a first contention-free random access (CFRA) resource usable for a potential timing advance (TA) acquisition for at least one candidate target cell and a second CFRA resource usable for a potential connection to a candidate target cell, a physical downlink control channel (PDCCH) order specifying the first CFRA resource, or a media access control-control element (MAC-CE) specifying the second CFRA resource.

Example 2.12. A processor-implemented method comprising:

providing, for a candidate target cell, at least one of distributed unit (DU) functionality or a layer 2 protocol of a radio access network and supporting a serving cell;

establishing a connection with a user equipment apparatus (UE) via the serving cell; and transmitting, towards the UE, at least one of:

a radio resource control (RRC) reconfiguration message using downlink RRC message transfer, the RRC reconfiguration message specifying at a first contention-free random access (CFRA) resource usable for a potential timing advance (TA) acquisition for at least one candidate target cell and a second CFRA resource usable for a potential connection to a candidate target cell, a physical downlink control channel (PDCCH) order specifying the first CFRA resource, or a media access control-control element (MAC-CE) specifying the second CFRA resource.

Example 3.1. A network node supporting at least one of central unit-control plane (CU-CP) functionality or a layer 3 protocol of a radio access network, the network node comprising:

at least one processor; and at least one memory storing instructions which, when executed by the at least one processor, cause the network node at least to:

receive, from a target network node which supports at least one of distributed unit (DU) functionality or a layer 2 protocol of a radio access network and which supports a candidate target cell, a contention-free random access (CFRA) resource usable for either of: a potential timing advance (TA) acquisition for the candidate target cell or a potential connection to a candidate target cell;

establish a connection with a user equipment apparatus (UE) via a serving cell, the serving cell supported by a source network node which supports at least one of distributed unit (DU) functionality or a layer 2 protocol of a radio access network; and transmit, towards the UE, a radio resource control (RRC) reconfiguration message specifying the CFRA resource.

Example 3.2. The network node of Example 3.1, wherein the instructions, when executed by the at least one processor, further cause the network node at least to:

receive, from the source network node, a message indicating the UE was triggered to perform the TA acquisition for the candidate target cell, and transmit, towards the target network node, the message indicating the UE was triggered to perform the TA acquisition for the candidate target cell.

Example 3.3. The network node of Example 3.1, wherein the instructions, when executed by the at least one processor, further cause the network node at least to:

receive, from the source network node, a message indicating the UE was triggered to connect to the candidate target cell, and transmit, towards the target network node, the message indicating the UE was triggered to connect to the candidate target cell.

Example 3.4. A processor-implemented method comprising:

receiving, from a target network node which supports at least one of distributed unit (DU) functionality or a layer 2 protocol of a radio access network and which supports a candidate target cell, a contention-free random access (CFRA) resource usable for either of: a potential timing advance (TA) acquisition for the candidate target cell or a potential connection to a candidate target cell;

establishing a connection with a user equipment apparatus (UE) via a serving cell, the serving cell supported by a source network node which supports at least one of distributed unit (DU) functionality or a layer 2 protocol of a radio access network; and transmitting, towards the UE, a radio resource control (RRC) reconfiguration message specifying the CFRA resource.

Example 3.5. The processor-implemented method of Example 3.1, further comprising:

receiving, from the source network node, a message indicating the UE was triggered to perform the TA acquisition for the candidate target cell, and transmitting, towards the target network node, the message indicating the UE was triggered to perform the TA acquisition for the candidate target cell.

Example 3.6. The processor-implemented method of Example 3.1, further comprising:

receiving, from the source network node, a message indicating the UE was triggered to connect to the candidate target cell, and transmitting, towards the target network node, the message indicating the UE was triggered to connect to the candidate target cell.

Example 3.7. A network node supporting at least one of central unit-control plane (CU-CP) functionality or a layer 3 protocol of a radio access network, the network node comprising:

at least one processor; and at least one memory storing instructions which, when executed by the at least one processor, cause the network node at least to:

receive, from a target network node which supports at least one of distributed unit (DU) functionality or a layer 2 protocol of a radio access network and which supports a candidate target cell, a first contention-free random access (CFRA) resource usable for a potential timing advance (TA) acquisition for the candidate target cell by the UE and a second CFRA resource usable for a potential connection to the candidate target cell by the UE; and establish a connection with a user equipment apparatus (UE) via a serving cell, the serving cell supported by a source network node which supports at least one of distributed unit (DU) functionality or a layer 2 protocol of a radio access network; and transmit, towards the UE, a radio resource control (RRC) reconfiguration message specifying the first CFRA resource and the second CFRA resource.

Example 3.8. A processor-implemented method comprising:

receiving, from a target network node which supports at least one of distributed unit (DU) functionality or a layer 2 protocol of a radio access network and which supports a candidate target cell, a first contention-free random access (CFRA) resource usable for a potential timing advance (TA) acquisition for the candidate target cell by the UE and a second CFRA resource usable for a potential connection to the candidate target cell by the UE; and establishing a connection with a user equipment apparatus (UE) via a serving cell, the serving cell supported by a source network node which supports at least one of distributed unit (DU) functionality or a layer 2 protocol of a radio access network; and transmitting, towards the UE, a radio resource control (RRC) reconfiguration message specifying the first CFRA resource and the second CFRA resource.

Example 4.1. A user equipment apparatus comprising:

means to establish a connection towards a source network node via a source cell supported by the source network node, wherein the source network node supports at least one of distributed unit (DU) functionality or a layer 2 protocol of a radio access network;

means to receive, from the radio access network, a configuration related to Layer 1/Layer 2 triggered mobility (LTM), the configuration indicating at least one candidate cell the user equipment apparatus may connect to:

means to receive, from the radio access network, a contention-free random access (CFRA) resource usable for either of: a potential timing advance (TA) acquisition for at least one candidate target cell or a potential connection to a specific candidate target cell; and means to use the CFRA resource for either of: acquiring TA for the specific candidate target cell, in response to receiving a respective TA acquisition request from the radio access network, or connecting to the specific candidate target cell, in response to receiving a respective trigger from the radio access network.

Example 4.2. The user equipment apparatus of Example 4.1, wherein receiving the CFRA resource comprises receiving, from the source network node, a physical downlink control channel (PDCCH) order specifying the CFRA resource, wherein the PDCCH order relates at least to TA acquisition.

Example 4.3. The user equipment apparatus of Example 4.1, wherein receiving the CFRA resource comprises receiving, from the source network node, a media access control-control element (MAC-CE) specifying the CFRA resource, wherein the MAC-CE relates at least to handover.

Example 4.4. The user equipment apparatus of Example 4.1, further comprising:

means to establish a connection with a control network node which supports at least one of central unit-control plane (CU-CP) functionality or a layer 3 protocol of a radio access network, wherein receiving the CFRA resource comprises receiving, from the control network node, a radio resource control (RRC) reconfiguration message specifying the CFRA resource.

Example 4.5. The user equipment apparatus of any of Example 4.1 to 4.4, further comprising:

means to, in case the CFRA resource is used for acquiring TA for the specific candidate target cell, receive a random access response (RAR) comprising TA information but having no uplink grant for a RRC reconfiguration complete message.

Example 4.6. The user equipment apparatus of Example 4.5, further comprising:

means to start a timer after receiving the TA acquisition request, wherein the CFRA resource is used for acquiring TA for the specific candidate target cell after the timer expires.

Example 4.7. The user equipment apparatus of any of Example 4.1 to 4.6, further comprising:

means to, in case the CFRA resource is used for connecting to the specific target candidate cell, receive a random access response (RAR) comprising TA information and an uplink grant for a RRC reconfiguration complete message.

Example 4.8. The user equipment apparatus of Example 4.7, further comprising:

means to start a timer after receiving the trigger, wherein the CFRA resource is used for connecting to the specific candidate target cell after the timer expires.

Example 5.1. A user equipment apparatus comprising:

means to establish a connection towards a source network node via a source cell supported by the source network node, wherein the source network node supports at least one of distributed unit (DU) functionality or a layer 2 protocol of a radio access network;

means to receive, from the radio access network, a configuration related to Layer 1/Layer 2 triggered mobility (LTM), the configuration indicating at least one candidate cell the user equipment apparatus may connect to:

means to receive, from the radio access network, a first contention-free random access (CFRA) resource usable for a potential timing advance (TA) acquisition for at least one candidate target cell, and a second CFRA resource usable for a potential connection to a specific candidate target cell; and means to use at least one of: the first CFRA resource for acquiring TA for the specific candidate target cell, in response to receiving a respective TA acquisition request from the radio access network, or the second CFRA resource for connecting to the specific candidate target cell, in response to receiving a respective trigger from the radio access network.

Example 5.2. The user equipment apparatus of Example 5.1, wherein the first CFRA resource and the second CFRA resource are received within one RRC message received from a control network node, wherein the control network node supports at least one of central unit (CU) functionality or a layer 3 protocol of the radio access network.

Example 5.3. The user equipment apparatus of Example 5.1, wherein the TA acquisition request and the first CFRA resource are received within a physical downlink control channel (PDCCH) order message received from the source network node, wherein the PDCCH order specifies at least one of: a dedicate RA preamble, a specific RA occasion, or a specific signal synchronization block (SSB) to be used for the TA acquisition.

Example 5.4. The user equipment apparatus of Example 5.1, wherein the trigger and the second CFRA resource are received within a media access control-control element (MAC-CE) message received from the source network node, wherein the MAC-CE message specifies at least one of: a dedicate RA preamble, a specific RA occasion, or a specific signal synchronization block (SSB) to be used for connecting to the specific target candidate cell.

Example 5.5. The user equipment apparatus of Example 5.1, wherein the TA acquisition request and the first CFRA resource are received within a physical downlink control channel (PDCCH) order message received from the source network node, wherein the PDCCH order specifies the first CFRA resource as at least one of: a dedicate RA preamble, a specific RA occasion, or a specific signal synchronization block (SSB) to be used for the TA acquisition, wherein the trigger and the second CFRA resource are received within a media access control-control element (MAC-CE) message received from the source network node, wherein the MAC-CE message specifies the second CFRA resource as at least one of: a dedicate RA preamble, a specific RA occasion, or a specific signal synchronization block (SSB) to be used for connecting to the specific target candidate cell, and wherein at least one of the first CFRA resource specified in the PDCCH order is different from at least one of the second CFRA resource specified in the MAC-CE message.

Example 5.6. The user equipment apparatus of any of Example 5.1 to 5.5, further comprising:

means to, in case the first CFRA resource is used for acquiring TA for the specific candidate target cell, receive a random access response (RAR) comprising TA information but having no uplink grant for a RRC reconfiguration complete message.

Example 5.7. The user equipment apparatus of any of Example 5.1 to 5.6, further comprising:

means to, in case the second CFRA resource is used for connecting to the specific candidate target cell, receiving a random access response (RAR) comprising TA information and an uplink grant for a RRC reconfiguration complete message.

Example 5.8. The user equipment apparatus of any of Example 5.1 to 5.7, wherein the first CFRA resource is indicated in a feature specific random access channel (RACH) configuration.

Example 5.9. The user equipment apparatus of Example 5.8, wherein the feature specific RACH configuration comprises an early_TA_acquisition feature that is indicated as true.

The embodiments and aspects disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect." "in aspects," "in various aspects." "in some aspects," or "in other aspects" may each refer to one or more of the same or different aspects in accordance with this disclosure. The phrase "a plurality of" may refer to two or more.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

While aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A user equipment apparatus comprising:

at least one processor; and at least one memory storing instructions which, when executed by the at least one processor, cause the user equipment apparatus at least to:

establish a connection towards a source network node via a source cell supported by the source network node, wherein the source network node supports at least one of distributed unit (DU) functionality or a layer 2 protocol of a radio access network;

receive, from the radio access network, a configuration related to Layer 1/Layer 2 triggered mobility (LTM), the configuration indicating at least one candidate cell the user equipment apparatus may connect to;

receive, from the radio access network, a contention-free random access (CFRA) resource, the CFRA resource being a same CFRA resource usable for either of: a potential timing advance (TA) acquisition for at least one candidate target cell or a potential connection to a specific candidate target cell;

in case of receiving a respective TA acquisition request from the radio access network, acquire TA for the specific candidate target cell using the same CFRA resource; and in case of receiving a respective trigger from the radio access network, connect to the specific candidate target cell using the same CFRA resource.

2. The user equipment apparatus of claim 1, wherein receiving the CFRA resource comprises receiving, from the source network node, a physical downlink control channel (PDCCH) order specifying the CFRA resource, wherein the PDCCH order relates at least to TA acquisition.

3. The user equipment apparatus of claim 1, wherein receiving the CFRA resource comprises receiving, from the source network node, a media access control-control element (MAC-CE) specifying the CFRA resource, wherein the MAC-CE relates at least to handover.

4. The user equipment apparatus of claim 1, wherein the instructions, when executed by the at least one processor, further cause the user equipment apparatus at least to:

establish a connection with a control network node which supports at least one of central unit-control plane (CU-CP) functionality or a layer 3 protocol of a radio access network, wherein receiving the CFRA resource comprises receiving, from the control network node, a radio resource control (RRC) reconfiguration message specifying the CFRA resource.

5. The user equipment apparatus of claim 1, wherein the instructions, when executed by the at least one processor, further cause the user equipment apparatus at least to:

in case the CFRA resource is used for acquiring TA for the specific candidate target cell, receive a random access response (RAR) comprising TA information but having no uplink grant for a RRC reconfiguration complete message.

6. The user equipment apparatus of claim 5, wherein the instructions, when executed by the at least one processor, further cause the user equipment apparatus at least to:

start a timer after receiving the TA acquisition request, wherein the CFRA resource is used for acquiring TA for the specific candidate target cell after the timer expires.

7. The user equipment apparatus of claim 1, wherein the instructions, when executed by the at least one processor, further cause the user equipment apparatus at least to:

in case the CFRA resource is used for connecting to the specific target candidate cell, receive a random access response (RAR) comprising TA information and an uplink grant for a RRC reconfiguration complete message.

8. The user equipment apparatus of claim 7, wherein the instructions, when executed by the at least one processor, further cause the user equipment apparatus at least to:

start a timer after receiving the trigger, wherein the CFRA resource is used for connecting to the specific candidate target cell after the timer expires.

9. A processor-implemented method in a user equipment apparatus, the processor-implemented method comprising:

establishing a connection towards a source network node via a source cell supported by the source network node, wherein the source network node supports at least one of distributed unit (DU) functionality or a layer 2 protocol of a radio access network;

receiving, from the radio access network, a configuration related to Layer 1/Layer 2 triggered mobility (LTM), the configuration indicating at least one candidate cell the user equipment apparatus may connect to;

receiving, from the radio access network, a contention-free random access (CFRA) resource, the CFRA resource being a same CFRA resource usable for either of: a potential timing advance (TA) acquisition for at least one candidate target cell or a potential connection to a specific candidate target cell;

in case of receiving a respective acquisition request from the radio access network, acquiring TA for the specific candidate target cell using the same CFRA resource; and in case of receiving a respective trigger from the radio access network, connecting to the specific candidate target cell using the same CFRA resource.

10. The processor-implemented method of claim 9, wherein receiving the CFRA resource comprises receiving, from the source network node, a physical downlink control channel (PDCCH) order specifying the CFRA resource, wherein the PDCCH order relates at least to TA acquisition.

11. The processor-implemented method of claim 9, wherein receiving the CFRA resource comprises receiving, from the source network node, a media access control-control element (MAC-CE) specifying the CFRA resource, wherein the MAC-CE relates at least to handover.

12. The processor-implemented method of claim 9, further comprising:

establishing a connection with a control network node which supports at least one of central unit-control plane (CU-CP) functionality or a layer 3 protocol of a radio access network, wherein receiving the CFRA resource comprises receiving, from the control network node, a radio resource control (RRC) reconfiguration message specifying the CFRA resource.

13. The processor-implemented method of claim 9, wherein the candidate target cell is supported by a target network node which supports at least one of distributed unit (DU) functionality or a layer 2 protocol of a radio access network, the processor-implemented method further comprising:

in case the CFRA resource is used for acquiring TA for the specific candidate target cell, receiving a random access response (RAR) comprising TA information but having no uplink grant for a RRC reconfiguration complete message.

14. The processor-implemented method of claim 13, further comprising:

starting a timer after receiving the TA acquisition request, wherein the CFRA resource is used for acquiring TA for the specific candidate target cell after the timer expires.

15. The processor-implemented method of claim 9, wherein the candidate target cell is supported by a target network node which supports at least one of distributed unit (DU) functionality or a layer 2 protocol of a radio access network, in case the CFRA resource is used for connecting to the specific target candidate cell, receiving a random access response (RAR) comprising TA information and an uplink grant for a RRC reconfiguration complete message.

16. The processor-implemented method of claim 15, further comprising:

starting a timer after receiving the trigger, wherein the CFRA resource is used for connecting to the specific candidate target cell after the timer expires.

17. A network node supporting at least one of distributed unit (DU) functionality or a layer 2 protocol of a radio access network and supporting a candidate target cell with which a user equipment apparatus (UE) may connect, the network node comprising:

at least one processor; and at least one memory storing instructions which, when executed by the at least one processor, cause the network node at least to:

allocate a contention-free random access (CFRA) resource, the CFRA resource being a same CFRA resource usable for either of: a potential timing advance (TA) acquisition for the candidate target cell by the UE or a potential connection to the candidate target cell by the UE; and transmit, towards a control network node supporting at least one of central unit-control plane (CU-CP) functionality or a layer 3 protocol of a radio access network, information specifying the same CFRA resource.

18. The network node of claim 17, wherein the UE is served by a serving cell that is supported by a source network node which supports at least one of distributed unit (DU) functionality or a layer 2 protocol of a radio access network, wherein the instructions, when executed by the at least one processor, further cause the network node at least to:

receive, from the UE, a random access preamble corresponding to the allocated CFRA resource;

in case of receiving a message, from the source network node, indicating the UE was triggered to perform the TA acquisition for the candidate target cell, transmit a random access response comprising TA information but having no uplink grant for a RRC reconfiguration complete message; and in case of not receiving a message, from the source network node, indicating the UE was triggered to perform the TA acquisition for the candidate target cell, transmit a random access response comprising TA information and an uplink grant for a RRC reconfiguration complete message.

19. The network node of claim 18, wherein the instructions, when executed by the at least one processor, further cause the network node at least to:

start a timer after receiving the random access preamble; and after the timer expires, determine whether a message, from the source network node, indicating the UE was triggered to perform the TA acquisition for the candidate target cell, was received.

20. The network node of claim 17, wherein the UE is served by a serving cell that is supported by a source network node which supports at least one of distributed unit (DU) functionality or a layer 2 protocol of a radio access network, wherein the instructions, when executed by the at least one processor, further cause the network node at least to:

receive, from the UE, a random access preamble corresponding to the allocated CFRA resource;

in case of receiving a message, from the source network node, indicating the UE was triggered to connect to the candidate target cell, transmit a random access response comprising TA information and an uplink grant for a RRC reconfiguration complete message; and in case of not receiving a message, from the source network node, indicating the UE was triggered to connect to the candidate target cell, transmit a random access response comprising TA information but having no uplink grant for a RRC reconfiguration complete message.

21. The network node of claim 20, wherein the instructions, when executed by the at least one processor, further cause the network node at least to:

start a timer after receiving the random access preamble; and after the timer expires, determine whether a message, from the source network node, indicating the UE was triggered to connect to the candidate target cell, was received.

22. A processor-implemented method comprising:

providing, for a candidate target node, at least one of distributed unit (DU) functionality or a layer 2 protocol of a radio access network;

allocating a contention-free random access (CFRA) resource, the CFRA resource being a same CFRA resource usable for either of: a potential timing advance (TA) acquisition for the candidate target cell by a user equipment apparatus (UE) or a potential connection to the candidate target cell by the UE; and transmitting, towards a control network node supporting at least one of central unit-control plane (CU-CP) functionality or a layer 3 protocol of a radio access network, information specifying the same CFRA resource.

23. The processor-implemented method of claim 22, wherein the UE is served by a serving cell that is supported by a source network node which supports at least one of distributed unit (DU) functionality or a layer 2 protocol of a radio access network, the processor-implemented method further comprising:

receiving, from the UE, a random access preamble corresponding to the allocated CFRA resource;

in case of receiving a message, from the source network node, indicating the UE was triggered to perform the TA acquisition for the candidate target cell, transmitting a random access response comprising TA information but having no uplink grant for a RRC reconfiguration complete message; and in case of not receiving a message, from the source network node, indicating the UE was triggered to perform the TA acquisition for the candidate target cell, transmitting a random access response comprising TA information and an uplink grant for a RRC reconfiguration complete message.

24. The processor-implemented method of claim 23, further comprising:

starting a timer after receiving the random access preamble; and after the timer expires, determining whether a message, from the source network node, indicating the UE was triggered to perform the TA acquisition for the candidate target cell, was received.

25. The processor-implemented method of claim 22, wherein the UE is served by a serving cell that is supported by a source network node which supports at least one of distributed unit (DU) functionality or a layer 2 protocol of a radio access network, the processor-implemented method further comprising:

receiving, from the UE, a random access preamble corresponding to the allocated CFRA resource;

in case of receiving a message, from the source network node, indicating the UE was triggered to connect to the candidate target cell, transmitting a random access response comprising TA information and an uplink grant for a RRC reconfiguration complete message; and in case of not receiving a message, from the source network node, indicating the UE was triggered to connect to the candidate target cell, transmitting a random access response comprising TA information but having no uplink grant for a RRC reconfiguration complete message.

26. The processor-implemented method of claim 25, further comprising:

starting a timer after receiving the random access preamble; and after the timer expires, determining whether a message, from the source network node, indicating the UE was triggered to connect to the candidate target cell, was received.

* * * * *